United States Patent
Nagano et al.

(10) Patent No.: US 9,154,671 B2
(45) Date of Patent: Oct. 6, 2015

(54) IMAGE PROCESSING APPARATUS, IMAGE PROCESSING METHOD, AND PROGRAM

(71) Applicant: SONY CORPORATION, Tokyo (JP)

(72) Inventors: Takahiro Nagano, Kanagawa (JP); Kenichiro Hosokawa, Kanagawa (JP); Yiwen Zhu, Kanagawa (JP); Shintaro Okada, Tokyo (JP); Kazunori Kamio, Kanagawa (JP)

(73) Assignee: Sony Corporation, Tokyo (JP)

( * ) Notice: Subject to any disclaimer, the term of this patent is extended or adjusted under 35 U.S.C. 154(b) by 332 days.

(21) Appl. No.: 13/743,690

(22) Filed: Jan. 17, 2013

(65) Prior Publication Data
US 2013/0300890 A1 Nov. 14, 2013

(30) Foreign Application Priority Data
May 14, 2012 (JP) .................................. 2012-110272

(51) Int. Cl.
*H04N 5/222* (2006.01)
*G06T 5/00* (2006.01)

(52) U.S. Cl.
CPC ............... *H04N 5/222* (2013.01); *G06T 5/001* (2013.01)

(58) Field of Classification Search
CPC .................................. G06T 5/001; H04N 5/22
USPC .................................. 382/181, 209, 219, 254
See application file for complete search history.

(56) References Cited

U.S. PATENT DOCUMENTS

| 5,450,208 A * | 9/1995 | Murata .......................... 358/296 |
| 5,687,279 A * | 11/1997 | Matthews ..................... 704/201 |
| 7,991,197 B2 * | 8/2011 | Natori ........................... 382/112 |
| 2002/0003895 A1 * | 1/2002 | Some ............................ 382/132 |

FOREIGN PATENT DOCUMENTS

JP 11-331595 11/1999

* cited by examiner

*Primary Examiner* — Samir Ahmed
(74) *Attorney, Agent, or Firm* — Paratus Law Group, PLLC

(57) ABSTRACT

An image processor includes a first acquirer that acquires a matching tap having a target pixel at the center, a second acquirer that acquires plural matching taps each having, at the center, one of pixels in a search area including the pixels surrounding the target pixel, a similarity identifier that identifies, among the matching taps acquired by the second acquirer, a similarity maximizing pixel representing a central pixel of the matching tap having the highest similarity to the matching tap acquired by the first acquirer, and a mixing controller that computes a pixel value of the target pixel by mixing a pixel value obtained by performing a predetermined arithmetic process on pixel values of a prediction tap having the target pixel at the center with a pixel value obtained by performing a predetermined arithmetic process on pixel values of a prediction tap having the similarity maximizing pixel at the center.

13 Claims, 22 Drawing Sheets

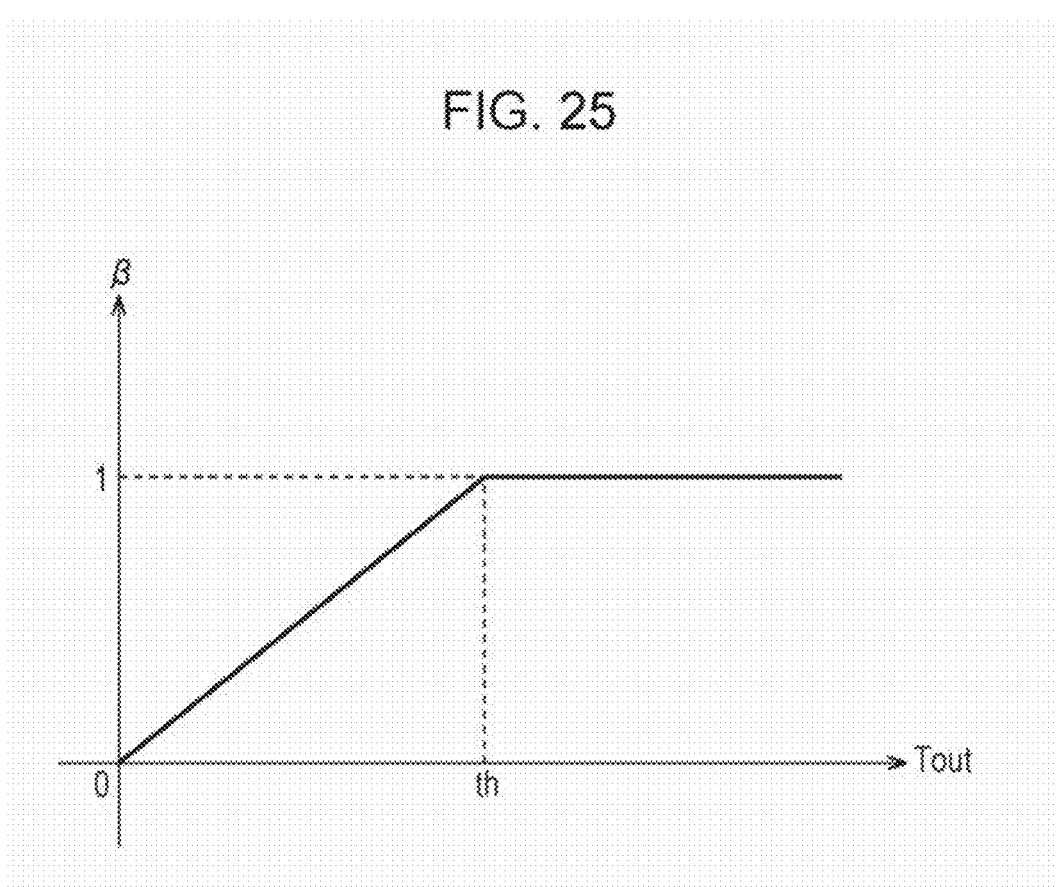

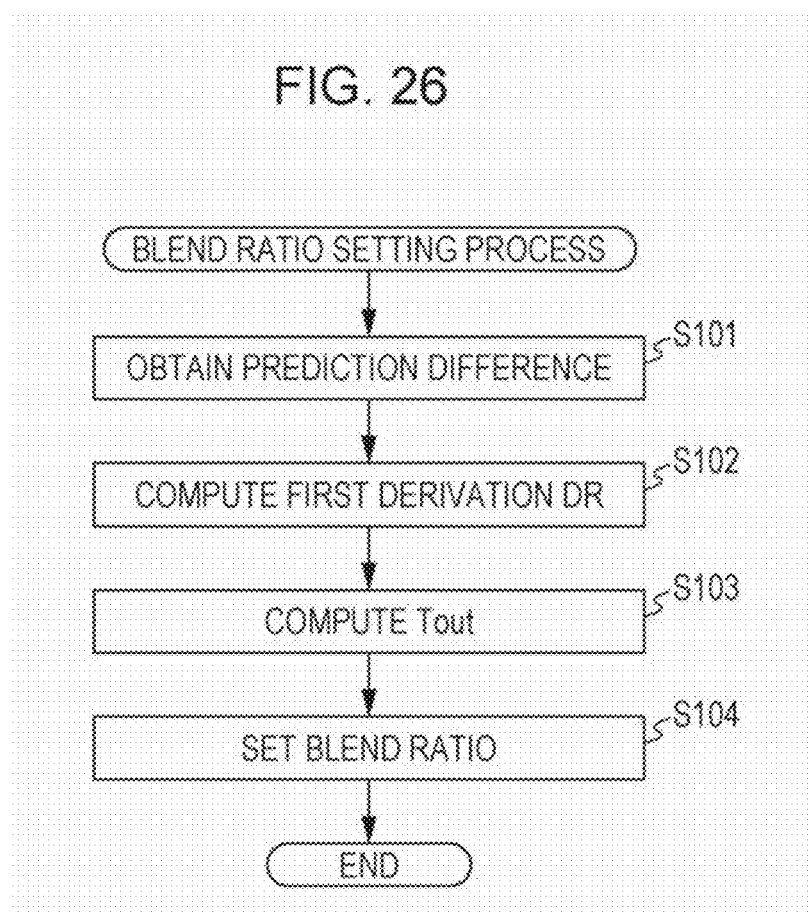

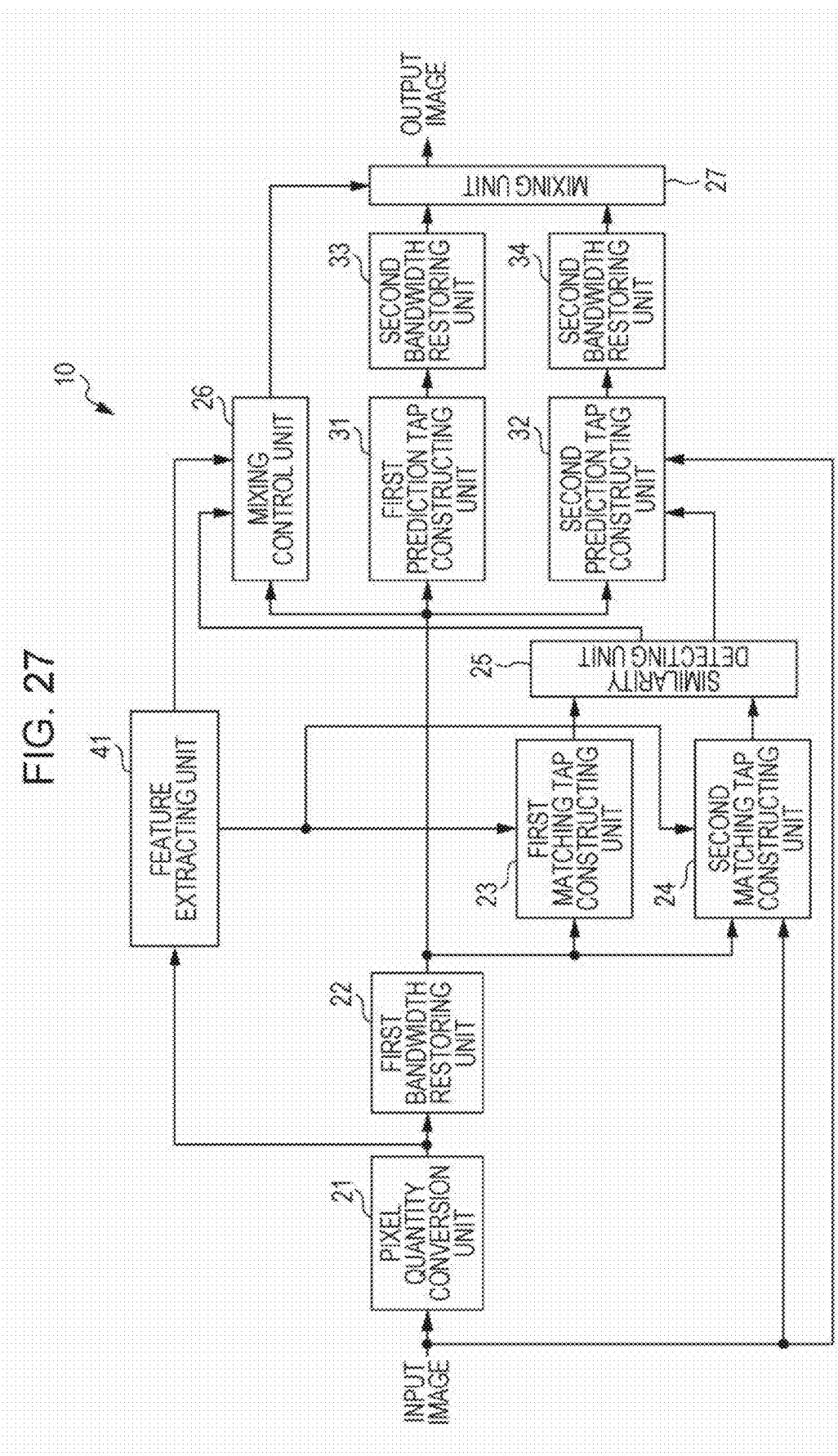

■ PIXEL USED FOR COMPUTING FEATURE

○ POSITION OF PIXEL OF INTEREST

● PIXEL OF INTEREST

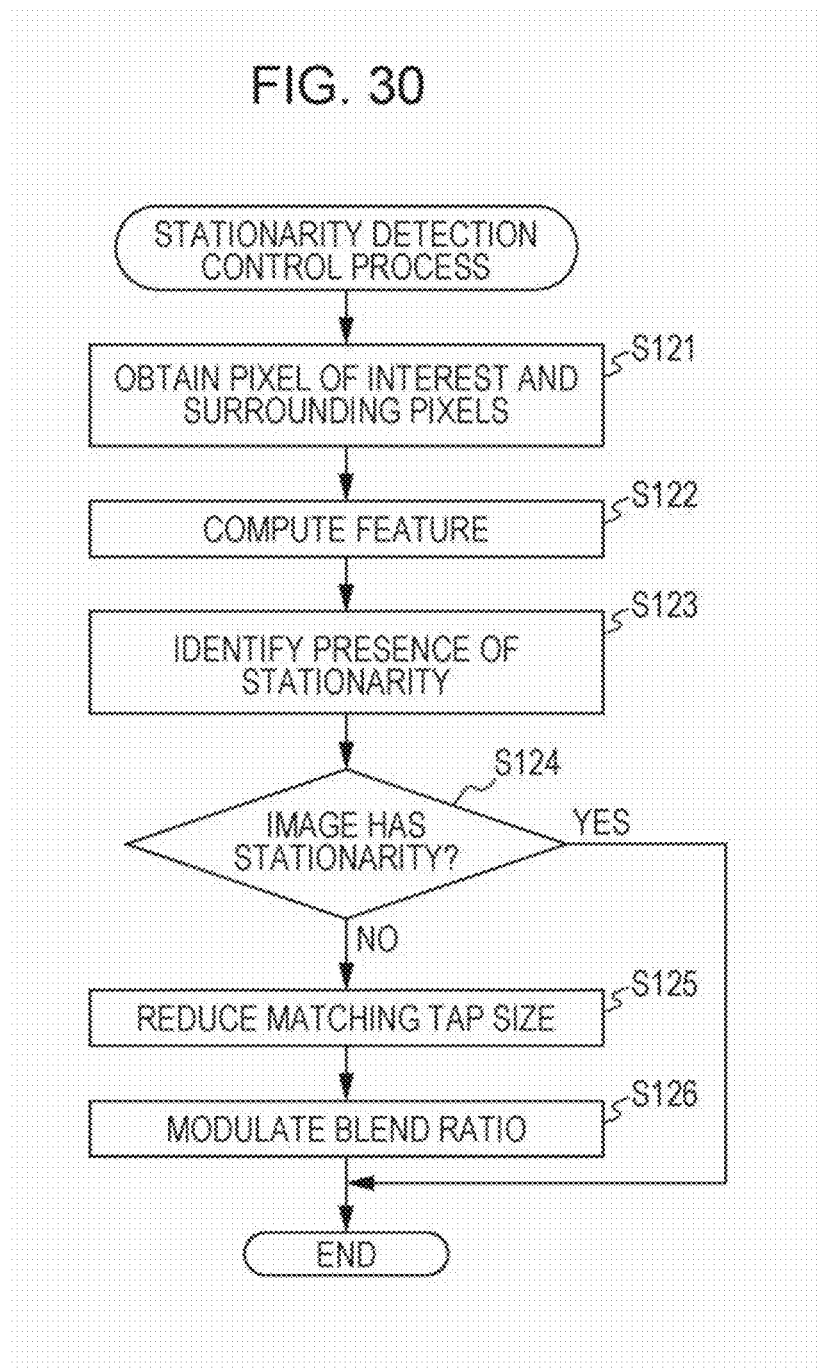

IMAGE PROCESSING APPARATUS, IMAGE PROCESSING METHOD, AND PROGRAM

BACKGROUND

The present disclosure relates to an image processing apparatus, an image processing method, and a program and, in particular, to an image processing apparatus, an image processing method, and a program capable of restoring detail clarity of any area of an image.

In general, "information" has bias (universality) of energy (entropy). This bias is recognized as information (valuable information).

For example, an image obtained by shooting a certain landscape is recognized as the image of landscape by a human being because the image (the pixel values of pixels constituting the image) has a bias of energy corresponding to that landscape. An image having no bias of energy is only noise or the like and is useless as information.

Therefore, even when the original bias of energy of valuable information is "destroyed" by manipulating the information in a certain way, the original information can be restored from the information subjected to the manipulation by restoring the destroyed bias of energy to the original bias of energy. That is, data obtained by manipulating the information can be restored to the original valuable information by using the original bias of energy of that information.

For example, part of an image obtained by shooting a landscape can be created using fractals (self-similarity) of the image. In an image including the images of, for example, the sea and wood, a similarity between a variation pattern of the pixel values of the entire image of the sea (e.g., the shape of the edge) and a variation pattern of the pixel values of part of the image of the sea is high. In contrast, a similarity between the variation pattern of the pixel values of the sea and a variation pattern of the pixel values of the image of the wood that is located away from the sea is low. That is, such a bias of the similarity appears.

Let part of the image of the sea be exchanged by part of the image of the wood.

Then, an image having a destroyed bias of the similarity can be obtained. However, by using the following bias of a similarity, the destroyed bias of similarity can be restored. That is, the bias of similarity indicates that the similarity between the variation patterns of pixel values of close parts is high and that as the distance between the parts increases, a similarity between variation patterns of pixel values of the parts becomes lower.

That is, according to the original bias of the similarity appearing in landscape images, it is clearly unnatural that part of an image of the sea is part of an image of a wood having a low similarity to the sea and, in addition, part of the image of the wood is part of the image of the sea. That is, the similarity in variation pattern between the image of the sea and part of the image of the wood present in the image of the sea is significantly lower than the similarity between part of the image of the sea and the other part of the image of the sea. In addition, the similarity in variation pattern between the image of the wood and part of the image of the sea present in the image of the wood is significantly lower than the similarity between part of the image of the wood and the other part of the image of the wood. In contrast, each of the similarity between the part of the image of wood present in the image of the sea and the image of the wood and the similarity between the part of the image of the sea present in the image of the wood and the image of the sea is high.

Therefore, according to the original bias of the similarity appearing in landscape images, it is desirable that the part of the image of wood present in the image of the sea be exchanged with the part of the image of the sea present in the image of the wood. By performing such exchange, the bias of the similarity in the image can be restored. In this manner, an original image can be restored.

In addition, by using such self-similarity in an image, image processing to improve the image quality can be performed. In such processing to improve the image quality using a self-similarity, a technique for improving the continuity of an image in a boundary portion has been developed (refer to, for example, Japanese Unexamined Patent Application Publication No. 11-331595).

SUMMARY

However, in some cases, if the existing processing using the self-similarity is employed, it is difficult to effectively process a local portion of the image.

More specifically, when, for example, an image is enlarged, a thin line may be rendered as a thick line. In addition, a fine pattern present in an input image may be deleted or may be degraded into an unnatural geometric pattern.

Furthermore, when the pixels are replaced on a block basis, the discontinuity of an image may appear in the border portion of the blocks. Still furthermore, if the bandwidth of an image is adjusted in order to increase the sharpness, such degradation may be made noticeable or the detail clarity may be lost.

In addition, in existing high image quality processing using a learning process (e.g., the Digital Reality Creation (DRC) process), a filter process is finally performed using pixels located in the vicinity of a pixel of interest. Accordingly, it is difficult to create the real detail clarity based on the output pixel rate.

Accordingly, it is desirable to provide an image processing apparatus, an image processing method, and a program capable of restoring detail clarity of any area of an image.

According to an embodiment of the present disclosure, an image processing apparatus includes a first matching tap acquiring unit configured to acquire a matching tap at the center of which is a pixel of interest, where the matching tap represents a plurality of pixels located at predetermined positions at the center of which is a predetermined pixel, a second matching tap acquiring unit configured to acquire a plurality of matching taps at the center of each of which is one of pixels in a search area formed from a plurality of pixels surrounding the pixel of interest, a similarity identifying unit configured to identify, among the plurality of matching taps acquired by the second matching tap acquiring unit, a similarity maximizing pixel representing a central pixel of the matching tap having the highest similarity to the matching tap acquired by the first matching tap acquiring unit, and a pixel value mixing control unit configured to compute a pixel value of the pixel of interest by mixing a first computed pixel value with a second computed pixel value, where the first computed pixel value is obtained by performing a predetermined arithmetic process on pixel values of a prediction tap at the center of which is the pixel of interest, the prediction tap represents a plurality of pixels located at predetermined positions at the center of which is a predetermined pixel, and the second computed pixel value is obtained by performing a predetermined arithmetic process on pixel values of a prediction tap at the center of which is the similarity maximizing pixel.

The pixel of interest in the matching tap acquired by the first matching tap acquiring unit can be a pixel of an image obtained by enlarging an input image by a desired magnification factor, and a bandwidth of the enlarged image can be restored by assigning the pixel value computed by the pixel value mixing control unit to the value of the pixel of interest.

A pixel interval of the matching tap acquired by the first matching tap acquiring unit can differ from a pixel interval of the matching tap acquired by the second matching tap acquiring unit, and the pixel interval of the matching tap acquired by the second matching tap acquiring unit can be determined in accordance with the magnification factor.

The pixel value mixing control unit can set a blend ratio of the first computed pixel value to the second computed pixel value in accordance with a level of the similarity between the matching tap acquired by the second matching tap acquiring unit and the matching tap acquired by the first matching tap acquiring unit.

The pixel value mixing control unit can mix the pixel values of the prediction tap at the center of which is the pixel of interest with the pixel values of the prediction tap at the center of which is the similarity maximizing pixel, and the pixel value mixing control unit can perform a predetermined arithmetic process on the pixel values of a mixed prediction tap to obtain a pixel value serving as a pixel value of the pixel of interest.

The pixel value mixing control unit can read, for each of classes grouped by feature computed in accordance with the pixel values of the prediction tap, a plurality of coefficients that correspond to the pixel positions constituting the prediction tap and that are obtained through learning and are prestored. The pixel value mixing control unit can compute the first computed pixel value by multiplying the pixel values of the prediction tap at the center of which is the pixel of interest by the coefficients, and the pixel value mixing control unit can compute the second computed pixel value by multiplying the pixel values of the prediction tap at the center of which is the similarity maximizing pixel by the coefficients.

The pixel value mixing control unit can compute a reference value corresponding to the pixel of interest on the basis of a dynamic range of a first derivative value in a predetermined direction in an area formed from a plurality of pixels at the center of which is the pixel of interest, and the pixel value mixing control unit can set a blend ratio of the first computed pixel value to the second computed pixel value on the basis of the reference value.

The pixel value mixing control unit can compute a reference value corresponding to the pixel of interest on the basis of an absolute difference value between the pixel values of the prediction tap at the center of which is the similarity maximizing pixel, and the pixel value mixing control unit can set a blend ratio of the first computed pixel value to the second computed pixel value on the basis of the reference value.

If it is determined that the stationarity is not present in the area, each of the first matching tap acquiring unit and the second matching tap acquiring unit can reduce the number of pixels of the matching tap.

The stationarity determination unit can determine whether the stationarity is present on the basis of one of a dynamic range of a first derivative value in a predetermined direction in the area formed from a plurality of pixels at the center of which is the pixel of interest, a variance of the pixel values in the area, and an output value of an edge extraction filter applied on an image in the area.

The image processing apparatus can further include a stationarity determination unit configured to determine whether a stationarity is present in an area formed from a plurality of pixels at the center of which is the pixel of interest. If it is determined that the stationarity is not present in the area, a blend ratio of the first computed pixel value to the second computed pixel value can be modulated.

According to another embodiment of the present disclosure, an image processing method includes acquiring a matching tap at the center of which is a pixel of interest using a first matching tap acquiring unit, where the matching tap represents a plurality of pixels located at predetermined positions at the center of which is a predetermined pixel, acquiring a plurality of matching taps at the center of each of which is one of pixels in a search area formed from a plurality of pixels surrounding the pixel of interest using a second matching tap acquiring unit, identifying, among the plurality of matching taps acquired by the second matching tap acquiring unit, a similarity maximizing pixel representing a central pixel of the matching tap having the highest similarity to the matching tap acquired by the first matching tap acquiring unit using a similarity identifying unit, and computing a pixel value of the pixel of interest using a pixel value mixing control unit by mixing a first computed pixel value with a second computed pixel value, where the first computed pixel value is obtained by performing a predetermined arithmetic process on pixel values of a prediction tap at the center of which is the pixel of interest, the prediction tap represents a plurality of pixels located at predetermined positions at the center of which is a predetermined pixel, and the second computed pixel value is obtained by performing a predetermined arithmetic process on pixel values of a prediction tap at the center of which is the similarity maximizing pixel.

According to still another embodiment of the present disclosure, a computer-readable program includes code for causing a computer to function as an image processing apparatus. The image processing apparatus including a first matching tap acquiring unit configured to acquire a matching tap at the center of which is a pixel of interest, where the matching tap represents a plurality of pixels located at predetermined positions at the center of which is a predetermined pixel, a second matching tap acquiring unit configured to acquire a plurality of matching taps at the center of each of which is one of pixels in a search area formed from a plurality of pixels surrounding the pixel of interest, a similarity identifying unit configured to identify, among the plurality of matching taps acquired by the second matching tap acquiring unit, a similarity maximizing pixel representing a central pixel of the matching tap having the highest similarity to the matching tap acquired by the first matching tap acquiring unit, and a pixel value mixing control unit configured to compute a pixel value of the pixel of interest by mixing a first computed pixel value with a second computed pixel value, where the first computed pixel value is obtained by performing a predetermined arithmetic process on pixel values of a prediction tap at the center of which is the pixel of interest, the prediction tap represents a plurality of pixels located at predetermined positions at the center of which is a predetermined pixel, and the second computed pixel value is obtained by performing a predetermined arithmetic process on pixel values of a prediction tap at the center of which is the similarity maximizing pixel.

According to the embodiment of the present disclosure, a matching tap at the center of which is a pixel of interest is acquired, where the matching tap represents a plurality of pixels located at predetermined positions at the center of which is a predetermined pixel. Thereafter, a plurality of matching taps at the center of each of which is one of pixels in a search area formed from a plurality of pixels surrounding the pixel of interest are acquired. Among the plurality of matching taps acquired by the second matching tap acquiring unit, a similarity maximizing pixel representing a central pixel of the matching tap having the highest similarity to the matching tap acquired by the first matching tap acquiring unit is identified. Finally, a pixel value of the pixel of interest is computed by mixing a first computed pixel value with a second computed pixel value, where the first computed pixel value is obtained by performing a predetermined arithmetic process on pixel values of a prediction tap at the center of which is the pixel of interest, the prediction tap represents a plurality of pixels located at predetermined positions at the center of which is a predetermined pixel, and the second computed pixel value is obtained by performing a predetermined arithmetic process on pixel values of a prediction tap at the center of which is the similarity maximizing pixel.

According to the present disclosure, in any area of an image, the detail clarity of the image can be restored.

BRIEF DESCRIPTION OF THE DRAWINGS

FIG. 25 illustrates a setting example of a blend ratio β performed by a mixing control unit.

FIG. 26 is a flowchart of an exemplary blend ratio setting process.

FIG. 27 is a block diagram of an exemplary configuration of an image processing apparatus according to another exemplary embodiment of the present disclosure.

FIG. 30 illustrates an example of a stationarity detection control process.

DETAILED DESCRIPTION OF EMBODIMENTS

Exemplary embodiments of the present disclosure are described below with reference to the accompanying drawings.

Figure 1:
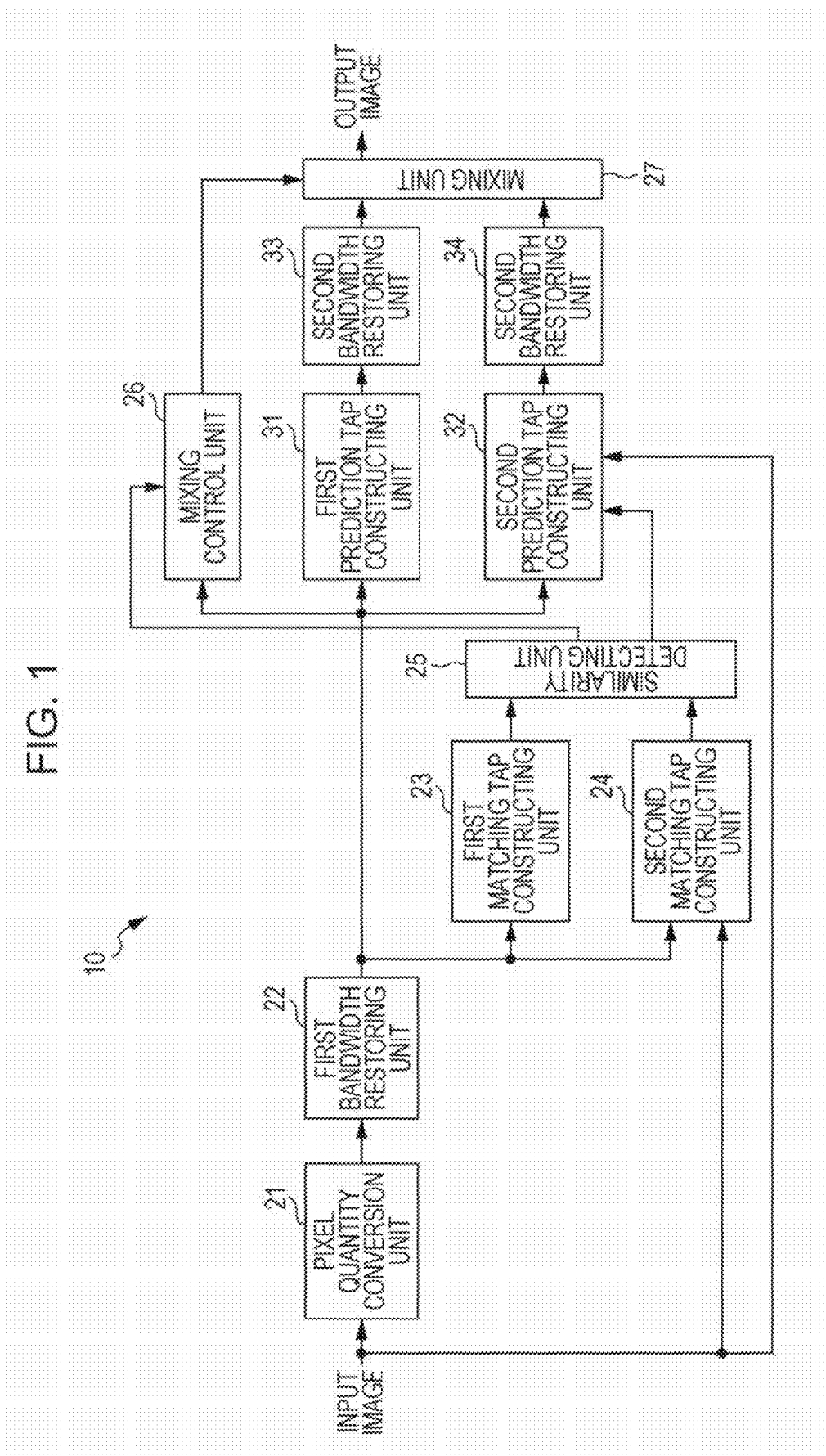
FIG. 1 is a block diagram of an exemplary configuration of an image processing apparatus according to an exemplary embodiment of the present disclosure.

FIG. 1 is a block diagram of an exemplary configuration of an image processing apparatus according to an exemplary embodiment of the present disclosure. As illustrated in FIG. 1, an image processing apparatus 10 includes a pixel quantity conversion unit 21, a first bandwidth restoring unit 22, a first matching tap constructing unit 23, a second matching tap constructing unit 24, a similarity detecting unit 25, a mixing control unit 26, and a mixing unit 27. In addition, the image processing apparatus 10 includes a first prediction tap constructing unit 31, a second prediction tap constructing unit 32, a second bandwidth restoring unit 33, and a second bandwidth restoring unit 34.

The pixel quantity conversion unit 21 converts the number of pixels of an input image in accordance by a desired magnification factor. At that time, the number of pixels is converted using a widely used pixel interpolation process with, for example, a Cubic filter or a Lanczos filter. Alternatively, the number of pixels may be converted using a classification/learning process. Note that an adaptive classification process is described in more detail below.

The first bandwidth restoring unit 22 restores the bandwidth of an entire image and adjusts the sharpness of the image. At that time, the bandwidth of an entire image is restored using a widely used bandwidth restoring filer. For example, a filtering process using a blur removal filter or a high-pass filter is employed. Alternatively, the bandwidth may be restored through conversion using an adaptive classification process. The adaptive classification process is described in more detail below.

The first matching tap constructing unit 23 and the second matching tap constructing unit 24 construct a tap used to detect self-similarity. As used herein, the term "constructing a tap" refers to acquiring the values of pixels located at a plurality of predetermined positions as a matching tap.

The first matching tap constructing unit 23 and the second matching tap constructing unit 24 construct the taps from an image enlarged through processes performed by the pixel quantity conversion unit 21 and the first bandwidth restoring unit 22 (hereinafter referred to as a "tentative output image").

Figure 2:
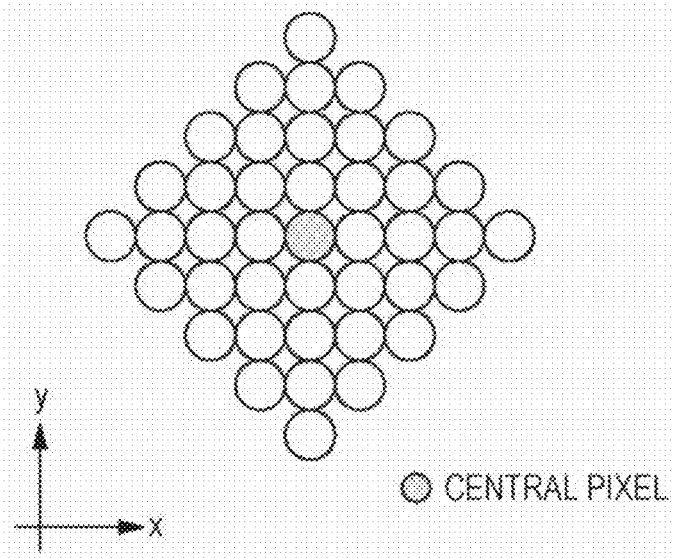
FIG. 2 illustrates an example of a matching tap.

FIG. 2 illustrates an example of a matching tap. In FIG. 2, each of circles represents a pixel. In the example of FIG. 2, a matching tap is formed from 41 pixels that form a square at the center of which is a central pixel. The central pixel is located at the barycentric position of the square.

The first matching tap constructing unit 23 considers a pixel of interest in the tentative output image as a central pixel of a matching tap. Thus, the first matching tap constructing unit 23 acquires the values of the pixels corresponding to the matching tap illustrated in FIG. 2. At that time, the first matching tap constructing unit 23 uses a matching tap having a distance between pixels that is smaller than that of the matching tap illustrated in FIG. 2. Hereinafter, "making intervals between pixels dense" is referred to as "making tap intervals dense".

Figure 3:
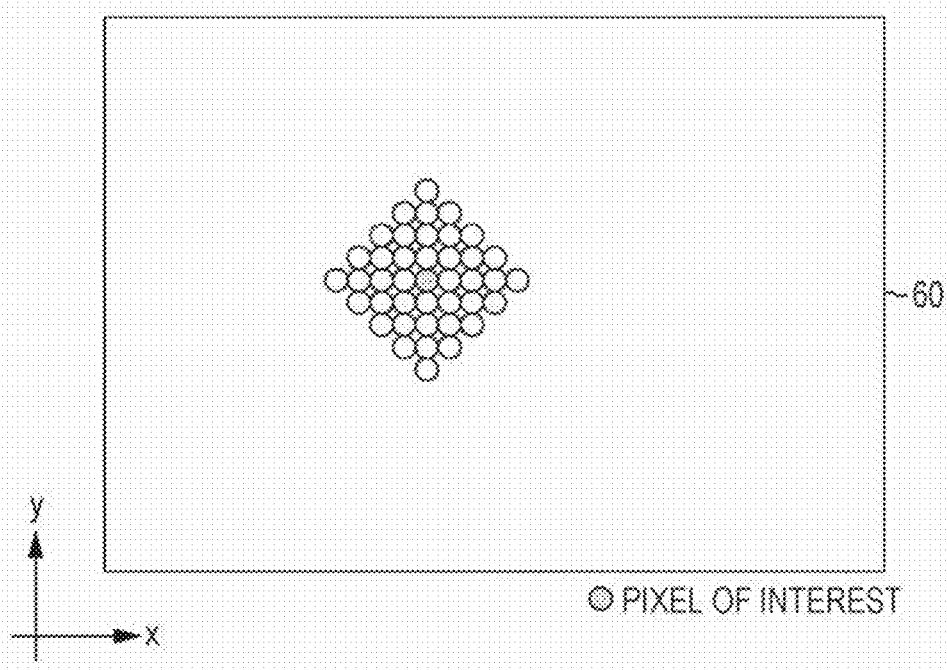
FIG. 3 illustrates an example of a matching tap having dense tap intervals.

FIG. 3 illustrates an example of a matching tap used by the first matching tap constructing unit 23 and having dense tap intervals. In the example illustrated in FIG. 3, a matching tap having dense tap intervals is constructed from a tentative output image 60.

The second matching tap constructing unit 24 constructs matching taps at the center of each of which is one of pixels in a search area formed from pixels in the vicinity of a pixel of interest in the tentative output image 60. At that time, the second matching tap constructing unit 24 uses the matching tap having a tap interval that differs from that of the matching tap illustrated in FIG. 3. For example, a matching tap having a distance between adjacent pixels that is longer than that of the matching tap illustrated in FIG. 3 (i.e., sparse tap intervals) is used.

Figure 4:
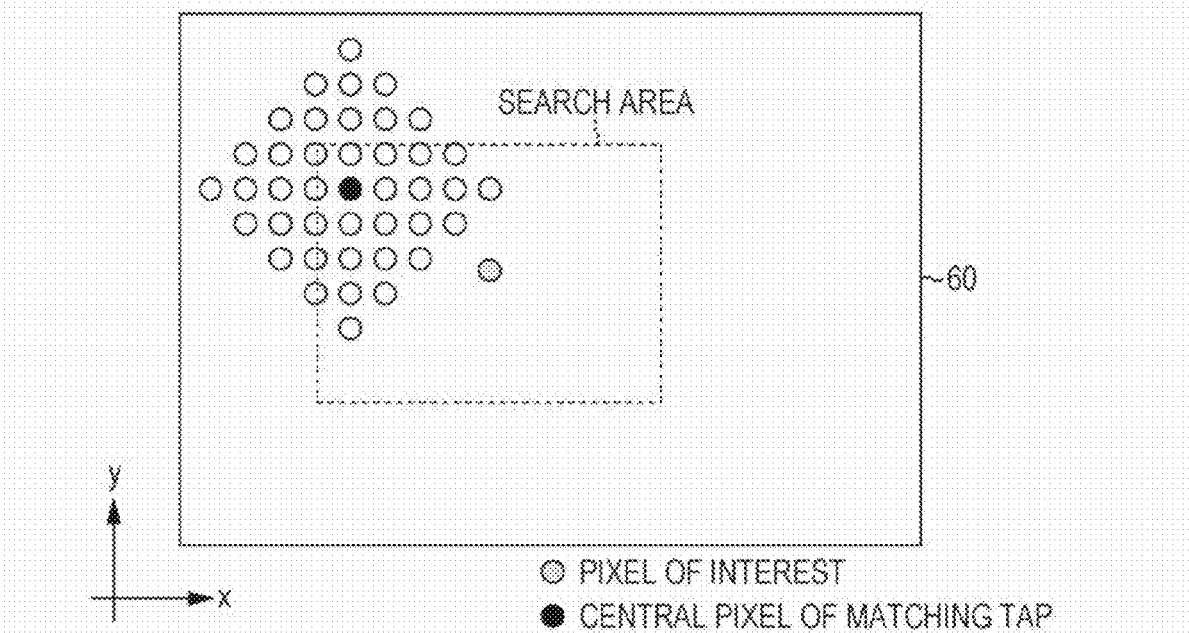
FIG. 4 illustrates an example of a matching tap having sparse tap intervals.

FIG. 4 illustrates an example of a matching tap used by the second matching tap constructing unit 24 and having sparse tap intervals. In the example illustrated in FIG. 4, a search area in the vicinity of a pixel of interest is indicated by a rectangle with a dotted line, and a matching tap at the center of which is a pixel located at the upper left corner of the search area is illustrated in a tentative output image 60.

The second matching tap constructing unit 24 sequentially constructs a matching tap at the center of which is each of the pixels located within the search area, as illustrated in FIG. 4. For example, if 100 pixels are included in the search area of the tentative output image 60, the second matching tap constructing unit 24 sequentially constructs 99 matching taps at the center of each of which is one of the 99 pixels other than the pixel of interest.

The tap interval of the matching tap used by the second matching tap constructing unit 24 is determined by, for example, the magnification factors in the horizontal and vertical directions. As described above, the pixel quantity conversion unit 21 performs pixel quantity conversion in accordance with a desired magnification factor. At that time, the magnification factor is defined for each of the horizontal and vertical directions.

Figure 5:
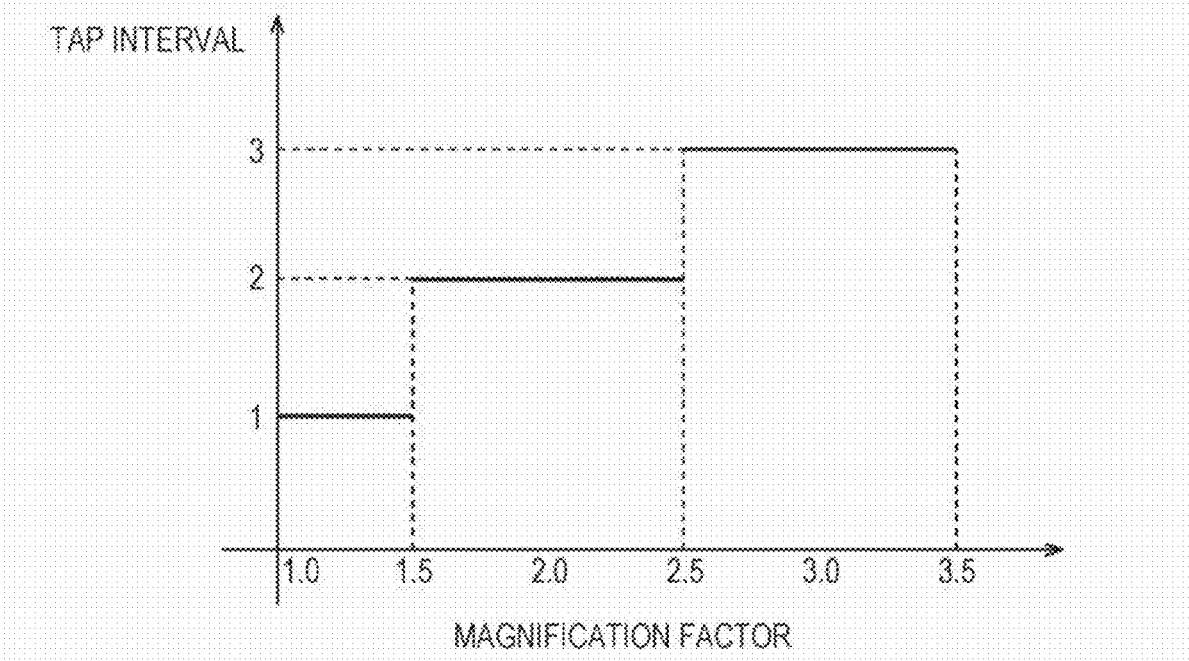
FIG. 5 illustrates an example of tap interval setting in accordance with a magnification factor.

FIG. 5 illustrates an example of tap interval setting in accordance with a magnification factor. In FIG. 5, the abscissa represents a magnification factor, and the ordinate represents a tap interval (a distance between adjacent pixels). The three solid lines indicate the tap intervals to be set. That is, if the magnification factor is in the range from 1.0 to about 1.5, the tap interval is set to 1. In addition, if the magnification factor is in the range from about 1.5 to about 2.5, the tap interval is set to 2. Furthermore, if the magnification factor is in the range from about 2.5 to about 3.5, the tap interval is set to 3.

For example, when the relationship illustrated in FIG. 5 is applied to a relationship between the magnification factor in the horizontal direction and the tap interval in the horizontal direction and if the magnification factor in the horizontal direction is 2.0, the distance between pixels of the matching tap in the horizontal direction is set to 2. In addition, for example, when the relationship illustrated in FIG. 5 is applied to a relationship between the magnification factor in the vertical direction and the tap interval in the vertical direction and if the magnification factor in the vertical direction is 2.0, the distance between pixels of the matching tap in the vertical direction is set to 2.

While the present exemplary embodiment has been described with reference to the example in which the tap interval of a matching tap is set in accordance with the magnification factor in each of the horizontal and vertical directions, the tap interval may be set in accordance with, for example, the bandwidth of the input image.

In addition, while the present exemplary embodiment has been described with reference to the second matching tap constructing unit 24 that constructs a tap from a tentative output image, the second matching tap constructing unit 24 may construct a tap from the input image. For example, in the example illustrated in FIG. 5, if the magnification factor is 2.0, the tap interval is set to 2. This operation is substantially the same as an operation in which in the image prior to magnification (i.e., the input image), a tap is constructed using a tap interval of 1. Accordingly, if, for example, the magnification factor is 2.0, the second matching tap constructing unit 24 may construct the matching tap from the input image using a tap interval of 1.

Figure 6:
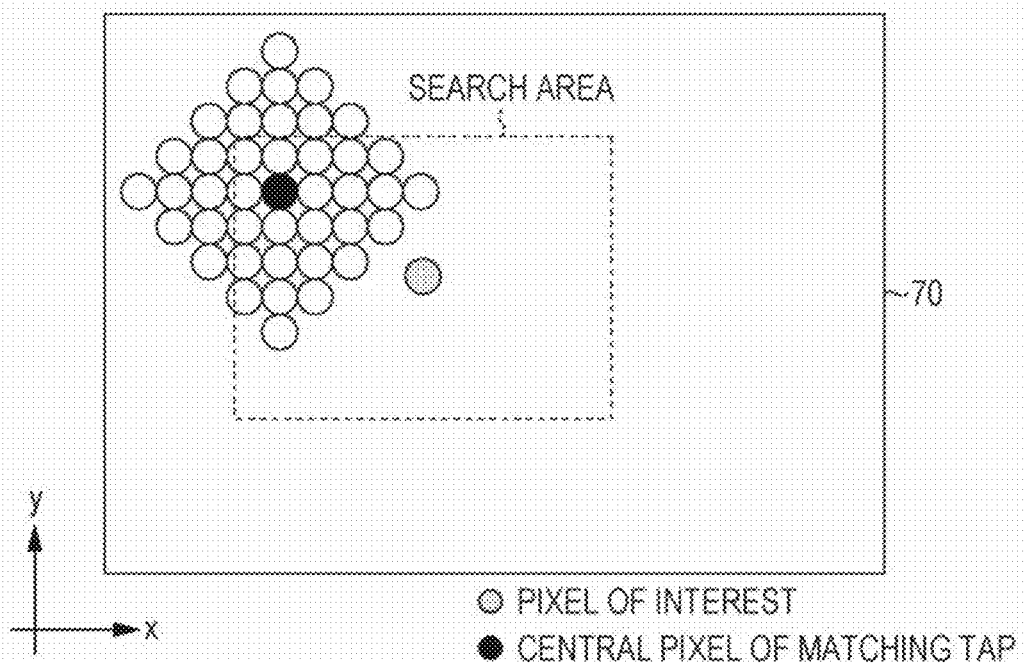
FIG. 6 illustrates an example of a matching tap constructed from the input image.

FIG. 6 illustrates an example of a matching tap that is used by the second matching tap constructing unit 24 and that is constructed from the input image. In such a case, as illustrated in FIG. 6, the position of a pixel of interest in an input image 70 is identified, and a rectangular search area illustrated by a dotted line is set around the pixel of interest. Thereafter, as illustrated in FIG. 6, in the search area within the input image 70, a matching tap at the center of which is each of the pixels located in the search area is sequentially constructed.

Referring back to FIG. 1, the similarity detecting unit 25 detects the similarity between the matching tap constructed by the first matching tap constructing unit 23 and the matching tap constructed by the second matching tap constructing unit 24.

Let $z_{1ij}$ be the pixel value of each of the pixels in the matching tap constructed by the first matching tap constructing unit 23, and let $z_{2ijk}$ be the pixel value of each of the pixels in the matching tap constructed by the second matching tap constructing unit 24. Then, an inverse $\text{diff}_{ik}$ of the similarity is computed as follows:

$$\text{diff}_{ik} = \sum_j |(z_{1ij} - \bar{z}_{1i}) - (z_{2ijk} - \bar{z}_{2ik})| \qquad (1)$$

where a suffix i denotes a number indicating the pixel position of the pixel of interest, a suffix j denotes a number indicating the pixel position of a pixel in the matching tap, and a suffix k denotes a number indicating the pixel position of a pixel in the search area.

In addition, in equation (1), a bar indicates an average value of the pixel values of the pixels in the matching tap. At that time, the average value is computed by simply summing the pixel values and dividing the sum by the number of the pixels. Alternatively, the average value may be computed by weighting some of the pixel values, summing all of the pixel values, and dividing the sum by the number of the pixels.

As $\text{diff}_{ik}$ computed using equation (1) decreases, the similarity between the two matching taps increases. "k" that minimizes the value of $\text{diff}_{ik}$ (i.e., the pixel position in the search area) is selected as a similarity maximizing pixel position $k_{min}$ as indicated by the following equation:

$$k_{min} = \underset{k}{\arg\min}(\text{diff}_{ik}) \qquad (2)$$

The similarity detecting unit 25 supplies the pixel position $k_{min}$ identified using equation (2) to the second prediction tap constructing unit 32. In addition, the similarity detecting unit 25 supplies the inverse $\text{diff}_{ik}$ of the similarity corresponding to the pixel position $k_{min}$ to the mixing control unit 26.

Each of the first prediction tap constructing unit 31 and the second prediction tap constructing unit 32 constructs a prediction tap from the tentative output image. The prediction tap is defined as a pixel group that is necessary for the second bandwidth restoring unit 33 or the second bandwidth restoring unit 34 to perform image processing to restore the bandwidth.

Figure 7:
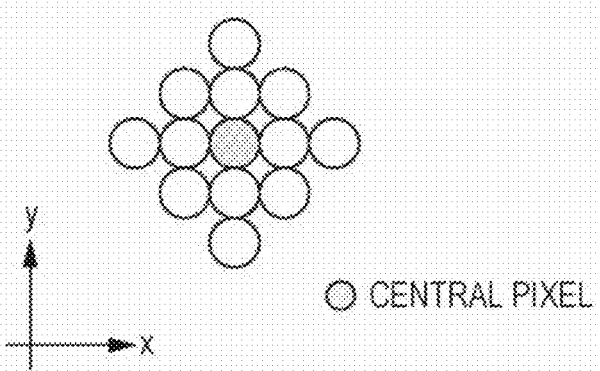
FIG. 7 illustrates an example of a prediction tap.

FIG. 7 illustrates an example of a prediction tap. In FIG. 7, each of circles represents a pixel. In the example illustrated in FIG. 7, the prediction tap is formed from 13 pixels that form a square. The central pixel of the prediction tap is located at the barycentric position of the square. That is, the number of pixels of the prediction tap illustrated in FIG. 7 is less than that of the matching tap illustrated in FIG. 2 (i.e., the tap size of the prediction tap illustrated in FIG. 7 is smaller than that of the matching tap illustrated in FIG. 2).

Figure 8:
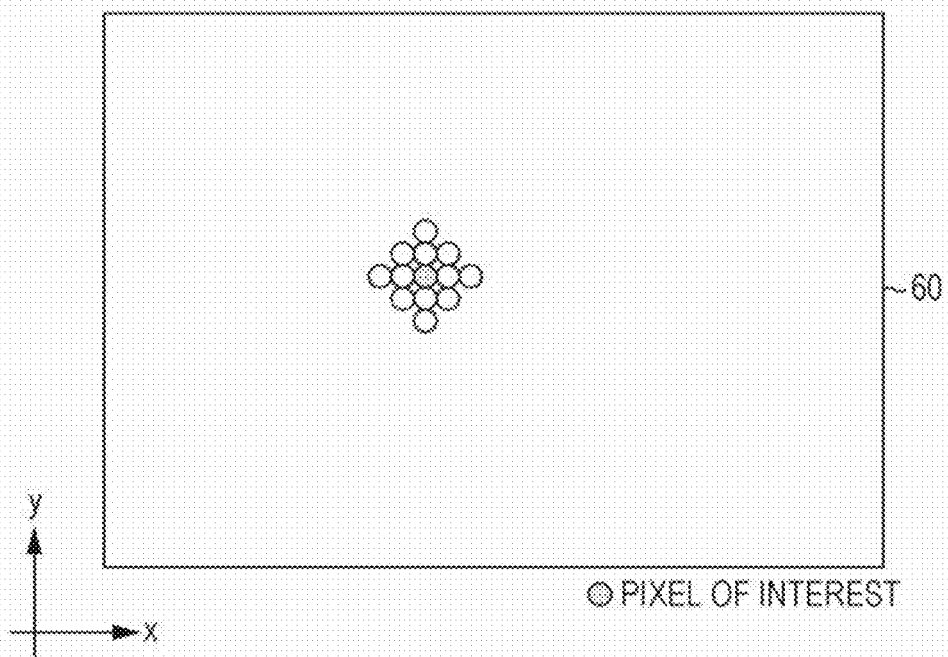
FIG. 8 illustrates an example of a prediction tap used by a first prediction tap constructing unit.

FIG. 8 illustrates a prediction tap used by the first prediction tap constructing unit 31 and constructed from the tentative output image. In the example illustrated in FIG. 8, the prediction tap is constructed from a plurality of pixels located around a pixel of interest in the tentative output image 60. Note that the pixel position of the pixel of interest (the pixel of interest illustrated in FIG. 8) of the first prediction tap constructing unit 31 is the same as that of the pixel of interest (the pixel of interest illustrated of FIG. 3) of the first matching tap constructing unit 23.

Figure 9:
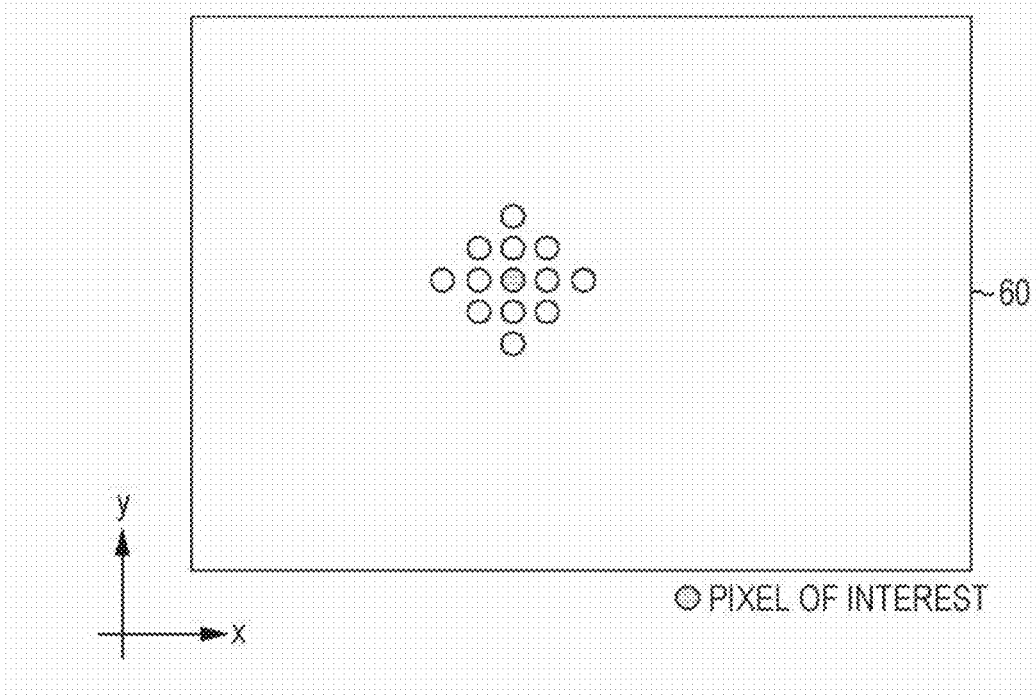
FIG. 9 illustrates another example of a prediction tap used by the first prediction tap constructing unit.

Note that for example, as illustrated in FIG. 9, the first prediction tap constructing unit 31 may construct a prediction tap having sparse pixel intervals.

Figure 10:
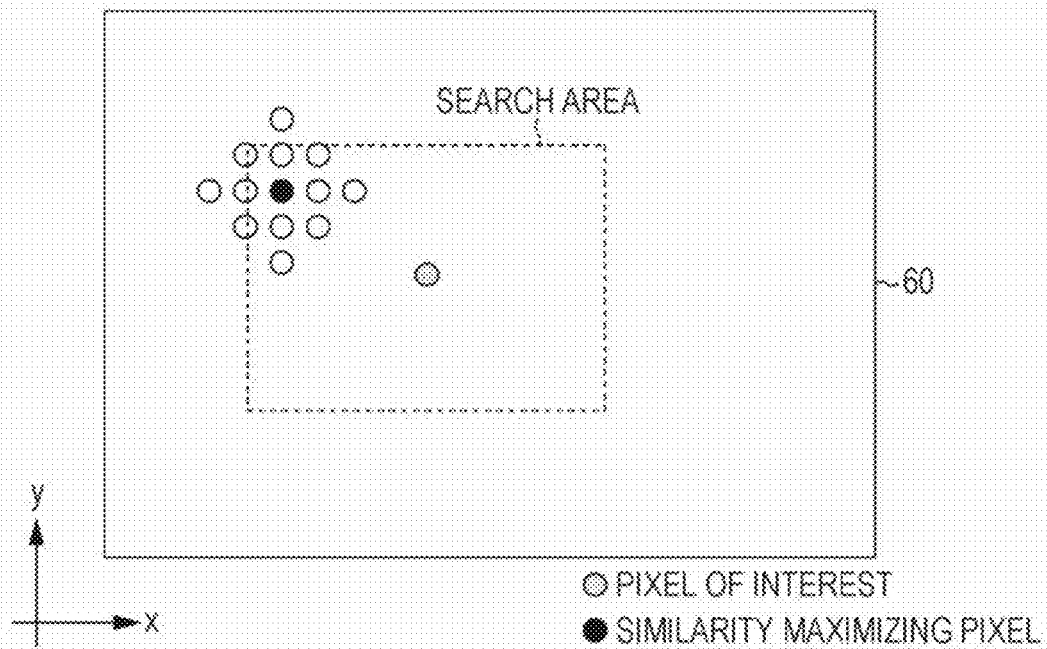
FIG. 10 illustrates an example of a prediction tap used by a second prediction tap constructing unit.

FIG. 10 illustrates a prediction tap used by the second prediction tap constructing unit 32 and constructed from the tentative output image. In the example illustrated in FIG. 10, a search area is indicated by a rectangle with a dotted line located around the pixel of interest of the tentative output image 60. A prediction tap at the center of which is the upper left pixel in the search area is constructed. Note that the pixel position of the central pixel (the black pixel in FIG. 10) of the second prediction tap constructing unit 32 is the same as the pixel position of the central pixel (the black pixel in FIG. 4) having a minimized inverse $\text{diff}_{ik}$ of the similarity among the central pixels of the second matching tap constructing unit 24.

That is, the second prediction tap constructing unit 32 constructs a prediction tap so that the central pixel of the prediction tap is located at the pixel position $k_{min}$ supplied from the similarity detecting unit 25.

Figure 11:
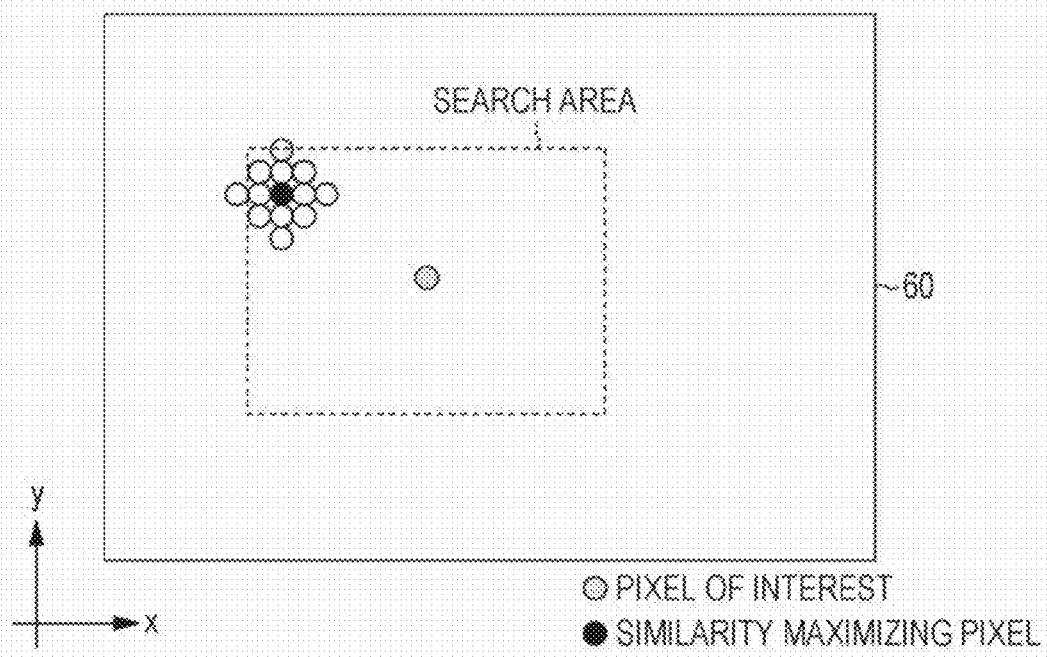
FIG. 11 illustrates another example of a prediction tap used by the second prediction tap constructing unit.

Note that for example, as illustrated in FIG. 11, the second prediction tap constructing unit 32 may construct a prediction tap having sparse pixel intervals.

That is, when a prediction tap is constructed, the tap interval that is the same as or is different from the tap interval set in constructing the matching tap may be set.

While the above description has been made with reference to the second prediction tap constructing unit 32 that constructs the tap from the tentative output image, the second prediction tap constructing unit 32 may construct a tap from the input image if the second matching tap constructing unit 24 constructs the tap from the input image.

Figure 12:
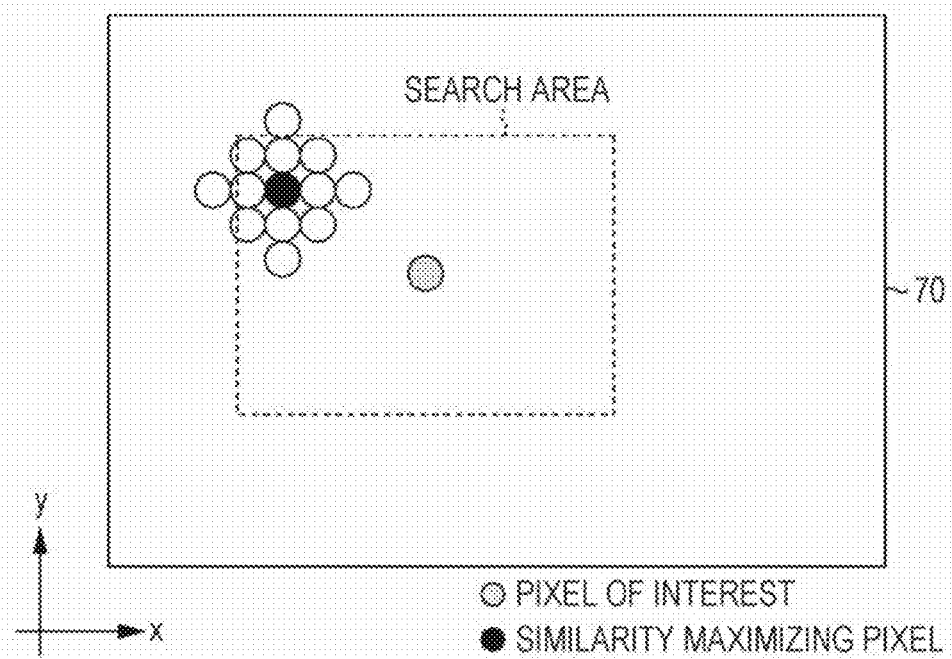
FIG. 12 illustrates a prediction tap used by the second prediction tap constructing unit and constructed from an input image.

FIG. 12 illustrates a prediction tap used by the second prediction tap constructing unit 32 and constructed from the input image. In such a case, as illustrated in FIG. 12, the position of the pixel of interest in the input image 70 is identified, and a prediction tap is constructed so that the center of the prediction tap is located at the similarity maximizing pixel position in the search area indicated by a rectangle with a dotted line around the pixel of interest.

Referring back to FIG. 1, the second bandwidth restoring unit 33 and the second bandwidth restoring unit 34 restore a local bandwidth of the image and adjust the sharpness of the image. At that time, the local bandwidth of the image is restored using a widely used bandwidth restoring filter. For example, a filtering process using a blur removal filter or a high-pass filter is employed. Alternatively, the bandwidth may be restored through conversion using an adaptive classification process. The adaptive classification process is described in more detail below.

Note that as described above, the second bandwidth restoring unit 33 and the second bandwidth restoring unit 34 restore a local bandwidth of the image on the basis of the prediction taps constructed by the first prediction tap constructing unit 31 and the second prediction tap constructing unit 32, respectively. For example, the pixel values of the pixels of the prediction tap are multiplied by predetermined coefficients. The obtained values are weighted and summed, and the resultant value is output as the value of the pixel of interest.

Through the above-described processing, the pixel values obtained by performing a bandwidth restoring process on the pixels located around the pixel of interest (the resultant value of the process performed by the second bandwidth restoring unit 33) and the pixel values obtained by performing a bandwidth restoring process on the pixels around the pixel located at the pixel position $k_{min}$ (the resultant value of the process performed by the second bandwidth restoring unit 34) are obtained.

The mixing unit 27 mixes the pixel value obtained by performing a bandwidth restoring process on the pixels located around the pixel of interest with the pixel value obtained by performing a bandwidth restoring process on the pixels around the pixel located at the pixel position $k_{min}$. At that time, the mixing unit 27 mixes the pixel value obtained by performing a bandwidth restoring process on the pixels around the pixel of interest with the pixel value obtained by performing a bandwidth restoring process on the pixels around the pixel located at the pixel position $k_{min}$ under the control of the mixing control unit 26.

The mixing unit 27 uses, for example, a blend ratio α supplied from the mixing control unit 26 and computes a pixel value to be output as follows:

$$y_i = \alpha y_{1i} + (1-\alpha) y_{2i} \qquad (3)$$

where $y_{1i}$ represents the output value of the second bandwidth restoring unit 33, $y_{2i}$ represents the output value of the second bandwidth restoring unit 34, and $y_i$ represents a final output value.

Figure 13:
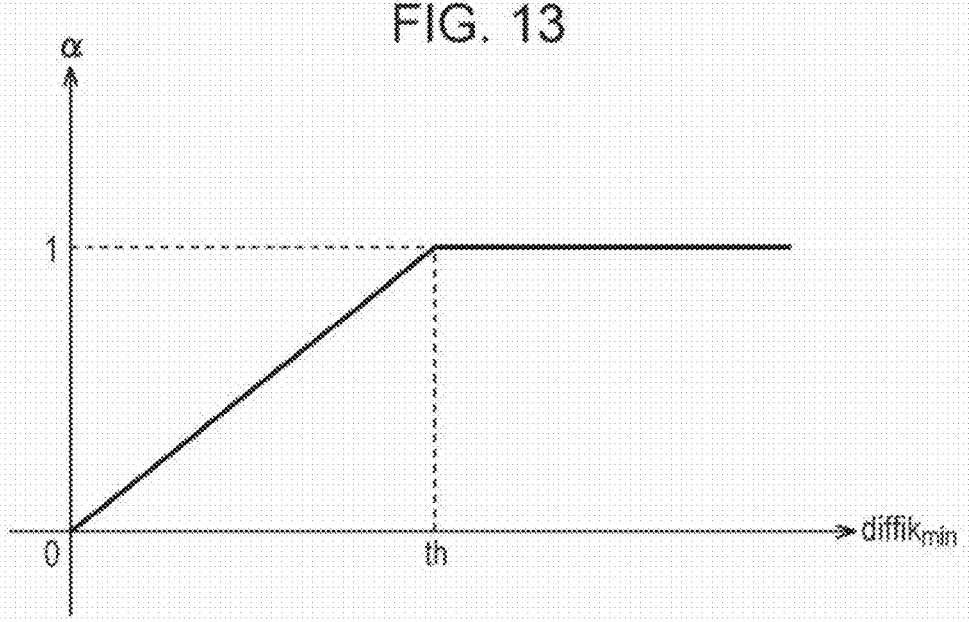
FIG. 13 illustrates an example of blend ratio α setting performed by a mixing control unit.

The mixing control unit 26 sets a blend ratio α in accordance with the value of $\text{diff}_{ik}$ computed using, for example, equation (1). FIG. 13 illustrates an example of blend ratio α setting performed by the mixing control unit 26. In FIG. 13, the abscissa represents $\text{diff}_{ik}$, and the ordinate represents α. That is, a value of the blend ratio α to be set in accordance with a value of $\text{diff}_{ik}$ is illustrated.

In the example of FIG. 13, if the value of $\text{diff}_{ik}$ is less than or equal to a threshold value th, the value of the blend ratio α is in the range 0≤α≤1. In that range, as the value of $\text{diff}_{ik}$ increases, the blend ratio α increases. If the value of $\text{diff}_{ik}$ exceeds the threshold value th, the value of the blend ratio α is set to a constant value of "1".

That is, if the similarity between the vicinity of the pixel of interest and the vicinity of the pixel located at the pixel position $k_{min}$ is high (i.e., if the value of $\text{diff}_{ik}$ is small), the blend ratio α is set so that the pixel value obtained by performing a bandwidth restoration process on the pixels located in the vicinity of the pixel position $k_{min}$ is strongly mixed. In contrast, if the similarity between the vicinity of the pixel of interest and the vicinity of the pixel located at the pixel position $k_{min}$ is low (i.e., if the value of $diff_{ik}$ is large), the blend ratio α is set so that the pixel value obtained by performing a bandwidth restoration process on the pixels located in the vicinity of the pixel of interest is strongly mixed. Alternatively, if the similarity between the vicinity of the pixel of interest and the vicinity of the pixel located at the pixel position $k_{min}$ is sufficiently low (i.e., if the value of $diff_{ik}$ exceeds the threshold value th), the blend ratio α is set so that only the pixel value obtained by performing the bandwidth restoring process on the vicinity of the pixel of interest is output.

In this manner, the image processing is performed by the image processing apparatus 10 according to the present exemplary embodiment. According to the present exemplary embodiment, as described above, when the self-similarity is detected, the tap interval is set in accordance with the magnification factor, and an area having a high similarity is detected. Thus, the similarity can be detected more accurately than, for example, in existing self-similarity detection techniques.

In addition, according to the present exemplary embodiment, the pixel value computed from the pixels around the pixel of interest in the input image is mixed with the pixel value computed from the pixels around the similarity maximizing pixel position, and the pixel value of the pixel of interest of the output image is obtained. Thus, unlike, for example, bandwidth restoration by simply replacing a partial image with an area having a high self-similarity, bandwidth restoration that is suitable for the characteristics of the image can be performed.

In this manner, according to the present exemplary embodiment, a problem frequently arising in existing image enlarging techniques can be addressed.

For example, according to the present exemplary embodiment, when an image is enlarged, a line can be enlarged without the line width enlarged.

In addition, according to the present exemplary embodiment, an image can be enlarged with edges being sharpened without causing ringing degradation.

Furthermore, according to the present exemplary embodiment, the details in a high-rate bandwidth can be produced and, thus, the detail clarity in the output image can be improved.

Still furthermore, when an image is enlarged, the effect of swelling noise can be reduced into fine noise.

Figure 14:
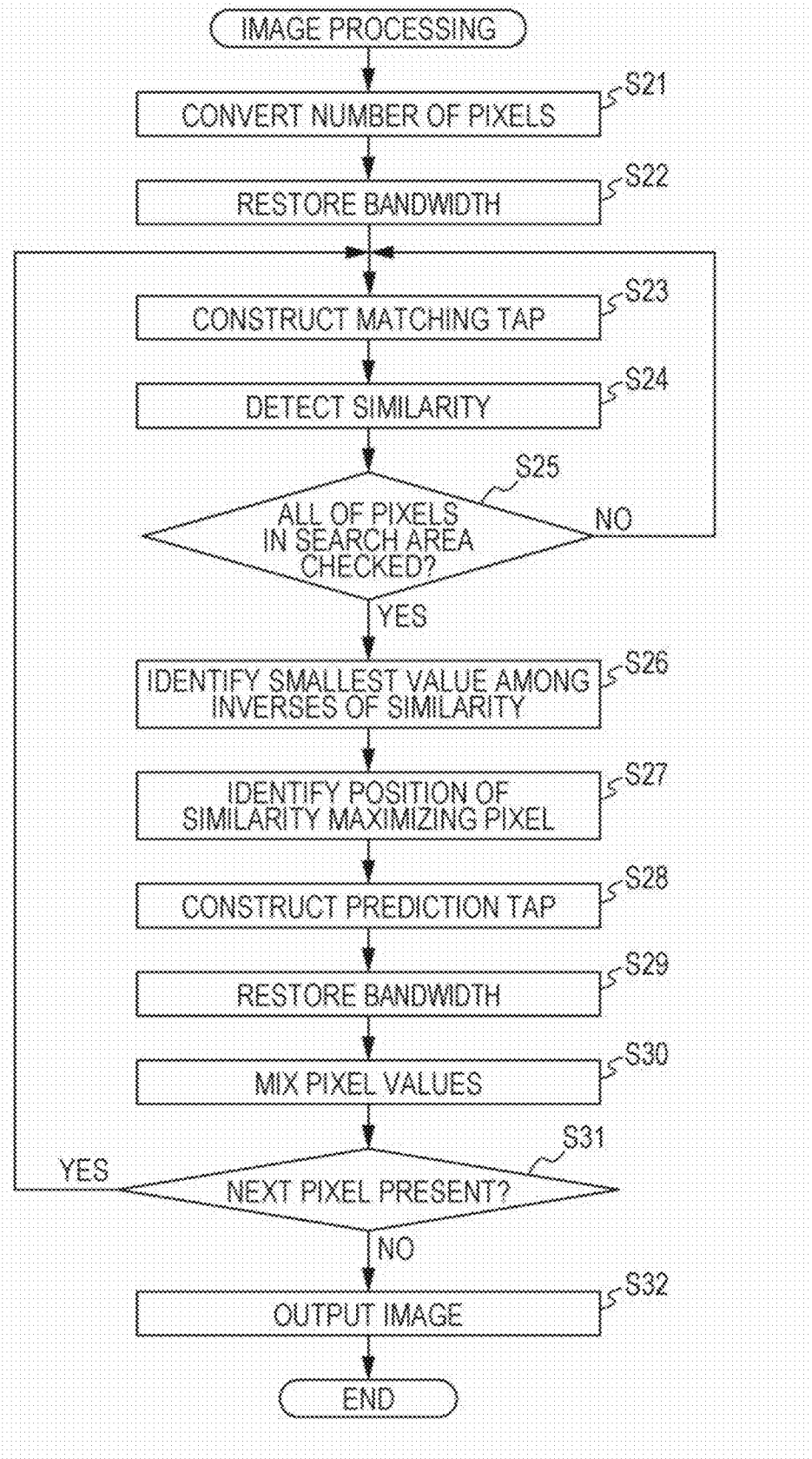
FIG. 14 is a flowchart of exemplary image processing.

Exemplary image processing performed by the image processing apparatus 10 according to the present exemplary embodiment is described below with reference to a flowchart illustrated in FIG. 14.

In step S21, the pixel quantity conversion unit 21 converts the number of pixels of an input image in accordance with a desired magnification factor. At that time, the number of pixels is converted using a widely used pixel interpolation process with, for example, a Cubic filter or a Lanczos filter.

In step S22, the first bandwidth restoring unit 22 restores the bandwidth of an entire image and adjusts the sharpness of the image. At that time, the bandwidth of an entire image is restored using a widely used bandwidth restoring filer. For example, a filtering process using a blur removal filter or a high-pass filter is employed. Alternatively, the bandwidth may be restored through conversion using an adaptive classification process.

In step S23, each of the first matching tap constructing unit 23 and the second matching tap constructing unit 24 constructs a prediction tap from a tentative output image acquired through the processes performed in steps S21 and S22.

At that time, for example, the prediction tap is constructed in the manner described above with reference to FIGS. 3 and 4. Note that the tap interval of the prediction tap of the second matching tap constructing unit 24 is set, for example, in the manner described above with reference to FIG. 5. Alternatively, as described above with reference to FIG. 6, the second matching tap constructing unit 24 may construct the prediction tap from the input image.

In step S24, the similarity detecting unit 25 detects the similarity between the matching tap constructed by the first matching tap constructing unit 23 and the matching tap constructed by the second matching tap constructing unit 24. At that time, for example, the inverse $diff_{ik}$ of the similarity is computed using equation (1).

In step S25, it is determined whether all of the pixels in the search area have been checked (e.g., whether the similarity has been detected for all of the pixels). If it is determined that all of the pixels in the search area have not yet been checked, the processing returns to step S23, where the second matching tap constructing unit 24 selects the next pixel in the search area as the central pixel of a prediction tap and constructs the prediction tap. Thereafter, the subsequent processes are repeated.

If, in step S25, it is determined that all of the pixels in the search area have been checked, the processing proceeds to step S26.

In step S26, the similarity detecting unit 25 identifies the lowest inverse $diff_{ik}$ of the similarity among the inverses $diff_{ik}$ computed in step S24.

In step S27, the similarity detecting unit 25 identifies the pixel position corresponding to the lowest inverse $diff_{ik}$ of the similarity identified in step S26 (i.e., a similarity maximizing pixel position $k_{min}$).

In step S28, each of the first prediction tap constructing unit 31 and the second prediction tap constructing unit 32 constructs a prediction tap from the tentative output image.

At that time the prediction tap is constructed in, for example, the manner described above with reference to FIGS. 8 to 11. Alternatively, for example, as described above with reference to FIG. 12, the second matching tap constructing unit 24 may construct the prediction tap from the input image.

In step S29, the second bandwidth restoring unit 33 and the second bandwidth restoring unit 34 restore a local bandwidth of the image and adjust the sharpness of the image. At that time, the local bandwidth of the image is restored using a widely used bandwidth restoring filter. For example, a filtering process using a blur removal filter or a high-pass filter is employed. Alternatively, the bandwidth may be restored through conversion using an adaptive classification process.

In step S30, the mixing unit 27 mixes a pixel value obtained by performing the bandwidth restoration process on the pixel of interest with a pixel value obtained by performing the bandwidth restoration process on the pixel located at the pixel position $k_{min}$. At that time, under the control of the mixing control unit 26, the mixing unit 27 mixes the pixel value obtained by performing the bandwidth restoration process on the pixels located around the pixel of interest with the pixel value obtained by performing the bandwidth restoration process on the pixels located around the pixel position $k_{min}$.

For example, the mixing unit 27 computes the pixel value on the basis of the blend ratio α supplied from the mixing control unit 26 using equation (3). Thereafter, the mixing unit 27 outputs the computed pixel value.

In step S31, it is determined whether the next pixel is present. That is, it is determined whether all of the pixels in the tentative output image have been selected as the pixel of interest and subjected to the processes in steps S23 to S30.

If, in step S31, it is determined that the next pixel is present, the processing returns to step S23, where the next pixel is selected as the pixel of interest. Thereafter, the subsequent processes are repeated.

However, if, in step S31, it is determined that the next pixel is not present, the processing proceeds to step S32.

In step S32, the image processing apparatus 10 outputs the image. In this manner, the image obtained by enlarging the input image by a desired magnification factor is output. At that time, the image can be enlarged without the line width of a line being increased. In addition, the image can be enlarged with edges being sharpened without causing ringing degradation. Furthermore, the detail clarity in the output image can be improved. Still furthermore, the effect of swelling noise can be reduced into fine noise.

As described above, the image processing is performed.

Figure 15:
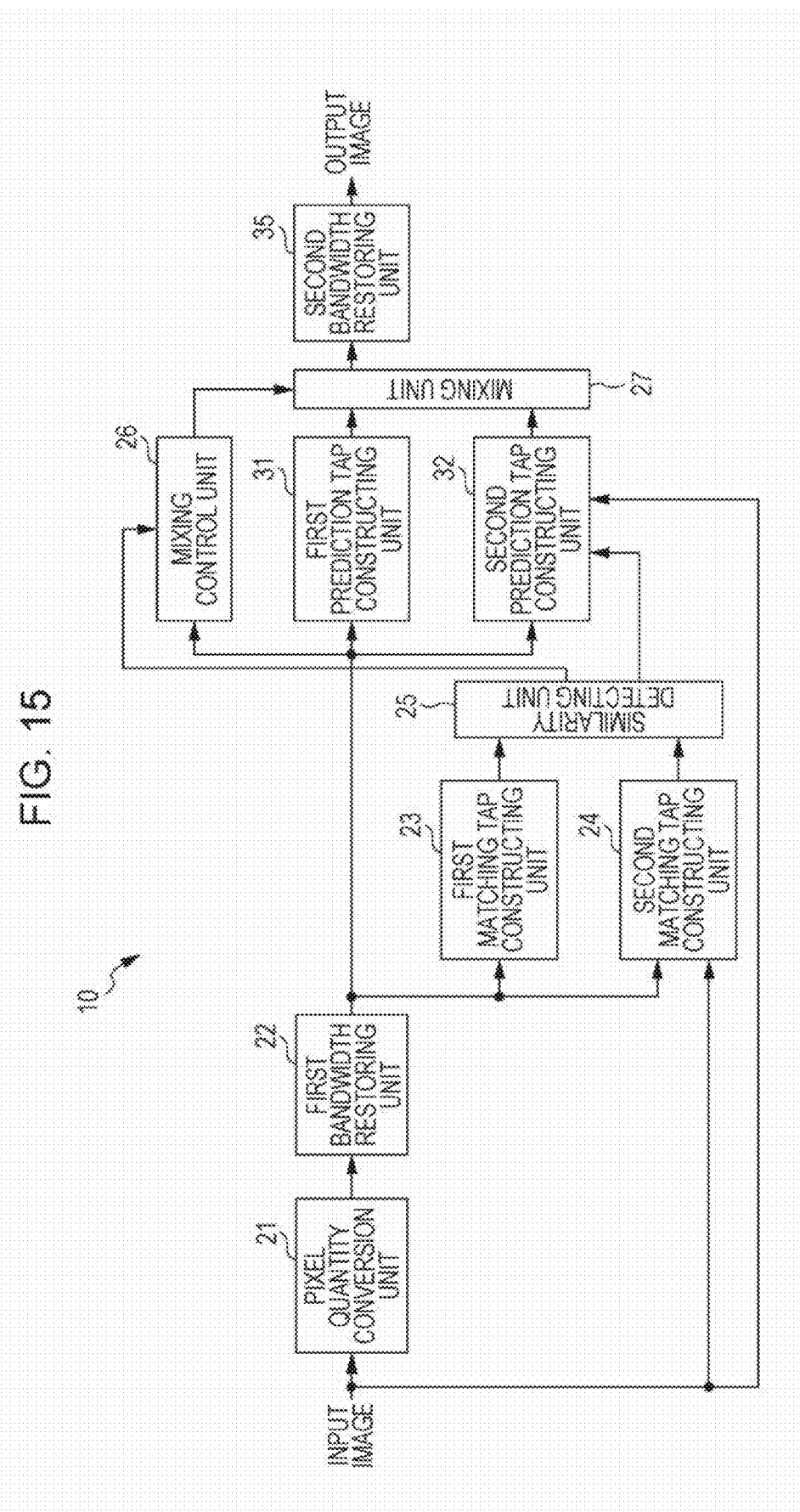
FIG. 15 is a block diagram of an exemplary configuration according to another exemplary embodiment of the present disclosure.

Note that for example, the image processing apparatus 10 illustrated in FIG. 1 may have a different configuration, as illustrated in FIG. 15. FIG. 15 is a block diagram of an exemplary configuration according to another exemplary embodiment of the present disclosure. In the image processing apparatus 10 illustrated in FIG. 15, the same reference symbol is used to indicate blocks which are the same as in FIG. 1.

Unlike the configuration illustrated in FIG. 1, in the image processing apparatus 10 illustrated in FIG. 15, data output from the first prediction tap constructing unit 31 and the second prediction tap constructing unit 32 are supplied to the mixing unit 27. In addition, data output from the mixing unit 27 is supplied to a second bandwidth restoring unit 35.

That is, in the configuration illustrated in FIG. 15, each of the pixels of the prediction tap constructed by the first prediction tap constructing unit 31 is mixed with one of the pixels of the prediction tap constructed by the second prediction tap constructing unit 32 in the blend ratio supplied from the mixing control unit 26.

Thereafter, the mixing unit 27 outputs the prediction tap subjected to the mixing operation. The second bandwidth restoring unit 35 restores a local bandwidth of the image and adjusts the sharpness of the image. For example, the second bandwidth restoring unit 35 multiplies the pixel values of the pixels of the prediction tap subjected to the mixing operation by predetermined coefficients. Subsequently, the second bandwidth restoring unit 35 weights and sums the obtained values. Thereafter, the second bandwidth restoring unit 35 outputs the sum as the value of the pixel of interest.

Since the other configurations of the image processing apparatus 10 illustrated in FIG. 15 are the same as those of FIG. 1, detailed descriptions of the configurations are not repeated.

As described above, the image processing apparatus of the present disclosure can be configured.

The adaptive classification process is described next. The adaptive classification process includes a classification process and an adaptation process. In the classification process, the data of an image are grouped into different classes on the basis of the characteristics of the data. Thereafter, an adaptation process is performed for each of the classes. In the adaptation process, for example, a low-quality image is converted into a high-quality image through mapping using a predetermined tap coefficient (hereinafter also referred to as a "prediction coefficient").

Figure 16:
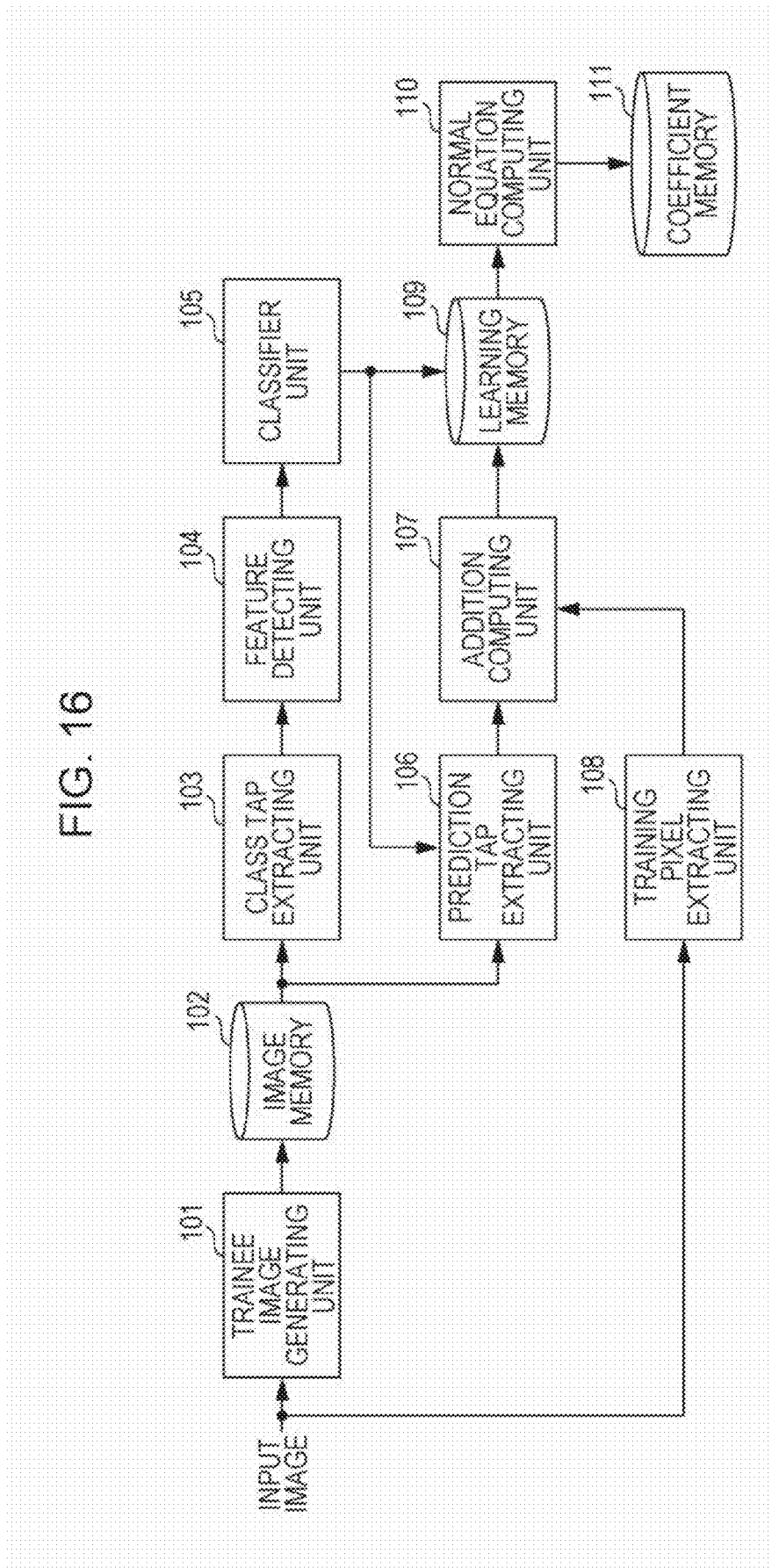
FIG. 16 is a block diagram of an exemplary configuration of a learning apparatus that generates a prediction coefficient used in an adaptive classification process.

FIG. 16 is a block diagram of an exemplary configuration of a learning apparatus that generates a prediction coefficient used in the adaptive classification process for generating a high-quality output image (e.g., a high-bandwidth image) from a low-quality input image (e.g., a low-bandwidth image).

The input image supplied to the image processing apparatus illustrated in FIG. 16 is a high-bandwidth image that serves as a training image. The input image is supplied to a trainee image generating unit 101 and a training pixel extracting unit 108. The pixel values of the pixels included in the training image are used as training data.

The trainee image generating unit 101 generates a trainee image which is a low-bandwidth image corresponding to the training image using, for example, a filter that adjusts the bandwidth of the training image which is the input high-bandwidth image. Thereafter, the trainee image generating unit 101 supplies the generated trainee image to an image memory 102.

The image memory 102 stores the trainee image supplied from the trainee image generating unit 101 and supplies the stored trainee image to a class tap extracting unit 103 and a prediction tap extracting unit 106.

The class tap extracting unit 103 sequentially selects one of the pixels as the pixel of interest and extracts a class tap corresponding to the selected pixel of interest from the trainee image and supplies the extracted class tap to a feature detecting unit 104 together with the trainee image. The feature detecting unit 104 detects the feature from the trainee image corresponding to the pixel of interest and supplies the detected feature to a classifier unit 105.

The classifier unit 105 groups the pixel of interest into one of the classes on the basis of the class tap and the feature supplied from the feature detecting unit 104 and supplies class code indicating the class to the prediction tap extracting unit 106 and a learning memory 109.

The prediction tap extracting unit 106 extracts, from the trainee image supplied from the image memory 102, a prediction tap corresponding to the selected class based on the class code supplied from the classifier unit 105. Thereafter, the prediction tap extracting unit 106 supplies the extracted prediction tap to an addition computing unit 107.

The training pixel extracting unit 108 extracts the pixel of interest of the training data, that is, the training image, and supplies the extracted training data to the addition computing unit 107.

The addition computing unit 107 adds, to a predetermined normal equation, the training data which are the pixel values of the high-bandwidth image and the prediction tap which represents the pixel values of the low-bandwidth image. Thereafter, the addition computing unit 107 supplies, to the learning memory 109, the normal equation having the training data and the prediction tap added thereto.

The learning memory 109 stores the normal equation supplied from the addition computing unit 107 for each of the classes on the basis of the class code supplied from the classifier unit 105. The learning memory 109 supplies, to a normal equation computing unit 110, the normal equation having the training data and the prediction tap added thereto and stored for each of the classes.

The normal equation computing unit 110 solves the normal equation supplied from the learning memory 109 using, for example, a sweep-out method. Thus, the normal equation computing unit 110 obtains a prediction coefficient for each of the classes. The normal equation computing unit 110 supplies the prediction coefficient for each of the classes to a coefficient memory 111.

The coefficient memory 111 stores the prediction coefficient for each of the classes supplied from the normal equation computing unit 110. The prediction coefficient stored in the coefficient memory 111 for each of the classes is supplied to a coefficient memory 124 (described in more detail below) of a bandwidth restoring apparatus.

Figure 17:
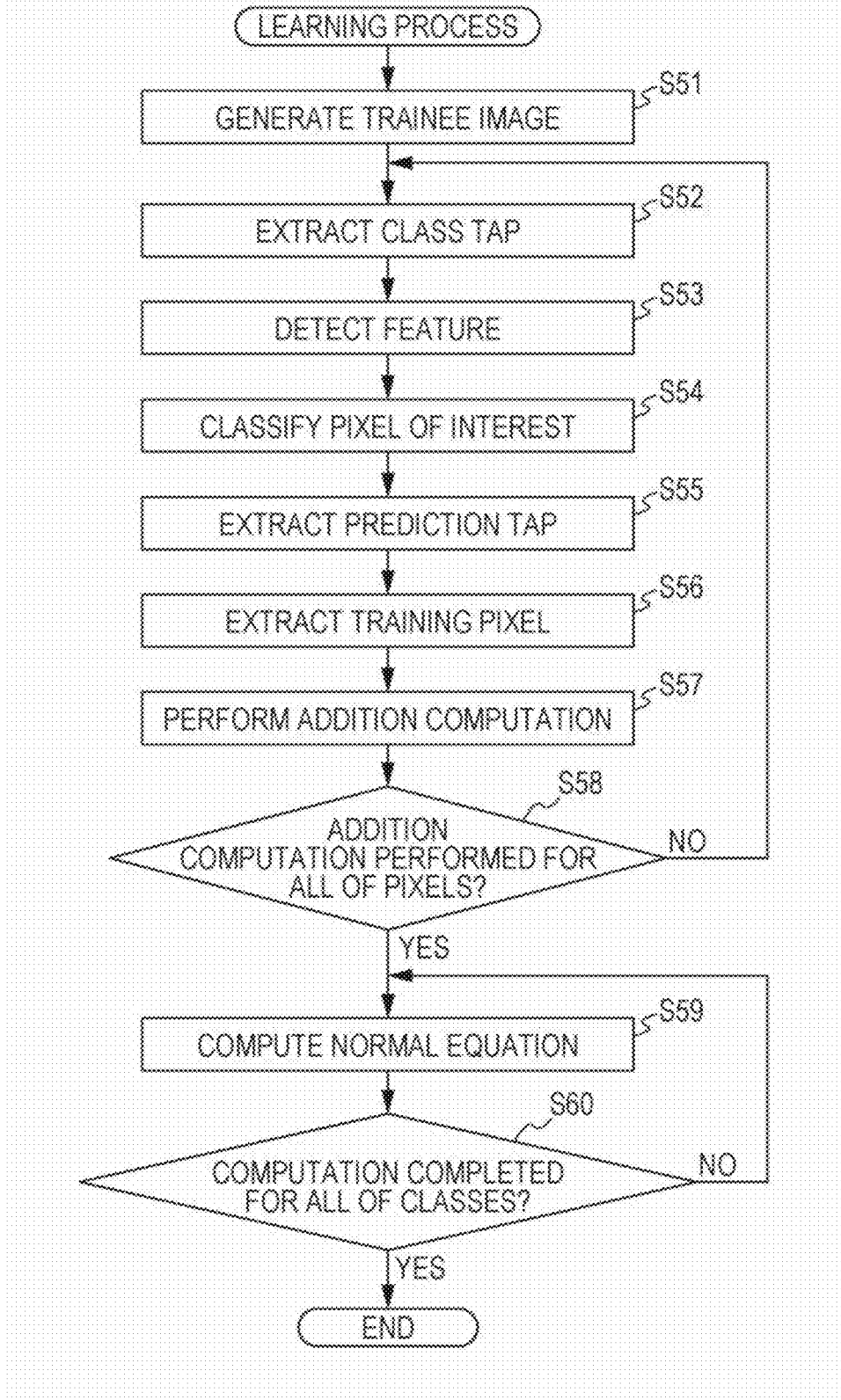
FIG. 17 is a flowchart illustrating a learning process.

FIG. 17 is a flowchart illustrating a learning process performed by a learning apparatus that generates a prediction coefficient used in the adaptive classification process.

In step S51, the trainee image generating unit 101 generates a trainee image from the input image serving as a training image. In step S52, the class tap extracting unit 103 sequentially selects one of the pixels as the pixel of interest and extracts a class tap corresponding to the selected pixel of interest.

In step S53, the feature detecting unit 104 extracts, from the trainee image, the feature corresponding to the pixel of interest. In step S54, the classifier unit 105 groups the pixel of interest into one of the classes on the basis of the class tap extracted in step S52 and the feature detected in step S53.

In step S55, the prediction tap extracting unit 106 extracts, from the trainee image, the prediction tap corresponding to the pixel of interest on the basis of the class selected in step S54.

In step S56, the training pixel extracting unit 108 extracts the pixel of interest, that is, a training pixel (the training data) from the input image serving as the training image.

In step S57, the addition computing unit 107 adds the prediction tap extracted in step S55 and the training pixel (the training data) extracted in step S56 to the normal equation.

In step S58, the image processing apparatus determines whether the addition process has been performed for all of the pixels of the training image. If it is determined that the addition process has not yet been performed for all of the pixels, the processing returns to step S52. In step S52, a pixel that has not been selected as the pixel of interest is selected as the pixel of interest, and the prediction tap and the training pixel are extracted and are added to the normal equation. This process is repeatedly performed.

However, if, in step S58, it is determined that the addition process has been performed for all of the pixels of the training image, the processing proceeds to step S59, where the normal equation computing unit 110 computes the normal equation having the prediction tap and the training pixel added thereto. Thus, the normal equation computing unit 110 obtains the prediction coefficient.

In step S60, the image processing apparatus determines whether the prediction coefficients are obtained for all of the classes. If it is determined that the prediction coefficients have not yet been obtained for all of the classes, the processing returns to step S59, where the normal equation is computed to obtain the prediction coefficient. This process is repeatedly performed.

However, if, in step S60, it is determined that the prediction coefficients have been obtained for all of the classes, the processing is completed.

Figure 18:
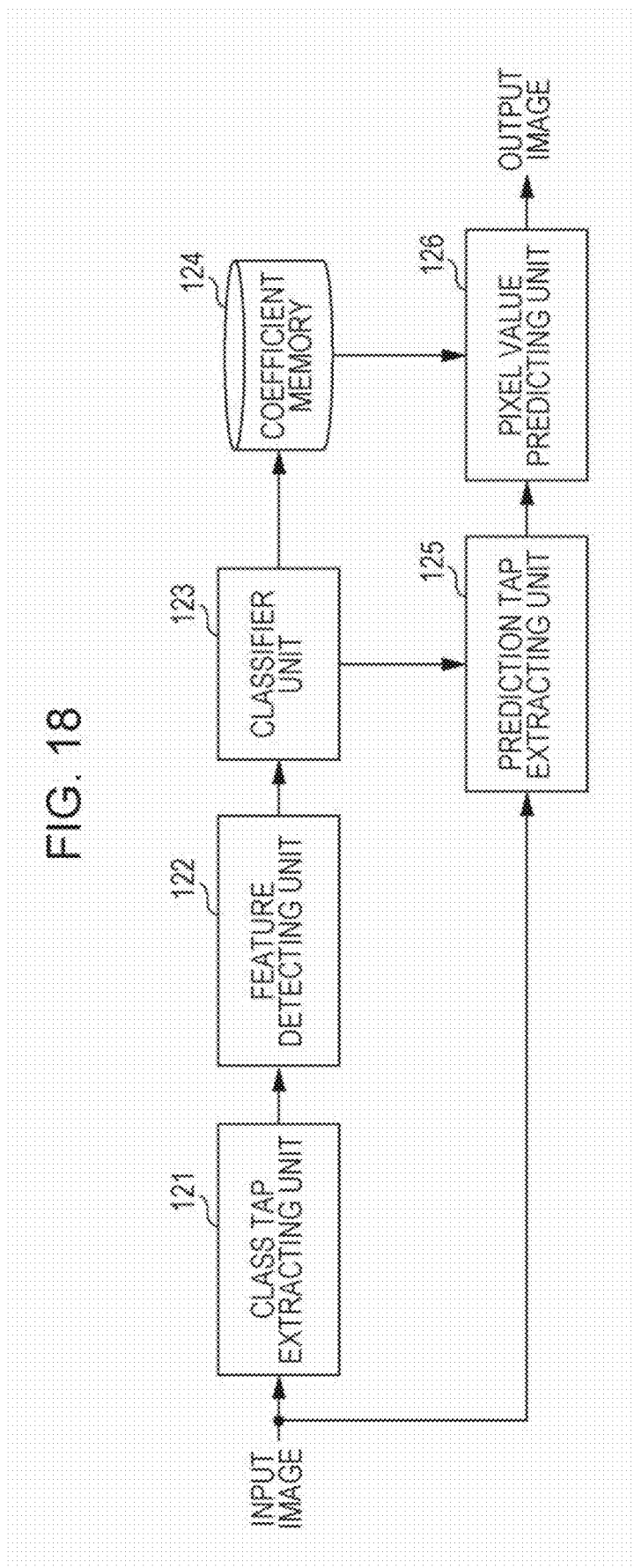
FIG. 18 is a block diagram illustrating an exemplary configuration of a bandwidth restoring apparatus that uses the adaptive classification process.

FIG. 18 is a block diagram illustrating an exemplary configuration of the bandwidth restoring apparatus that generates a high-bandwidth output image from the low-bandwidth input image through the adaptive classification process.

In the bandwidth restoring apparatus illustrated in FIG. 18, the input image is supplied to a class tap extracting unit 121 and a prediction tap extracting unit 125.

The class tap extracting unit 121 extracts the class tap which corresponds to the pixel of interest and which is a predetermined pixel from the input image and supplies the extracted class tap to a feature detecting unit 122 together with the input image. The feature detecting unit 122 detects the feature of the image corresponding to the pixel of interest from the input image supplied from the class tap extracting unit 121. Thereafter, the feature detecting unit 122 supplies the detected feature to a classifier unit 123 together with the class tap.

The classifier unit 123 classifies the pixel of interest on the basis of the class tap and the feature supplied from the feature detecting unit 122 and supplies class code indicating the result of the classification to the coefficient memory 124 and the prediction tap extracting unit 125.

The coefficient memory 124 supplies, to a pixel value predicting unit 126, a tap coefficient corresponding to the class of the pixel of interest on the basis of the class code supplied from the classifier unit 123. The coefficient memory 124 stores the prediction coefficient computed in the process illustrated in FIG. 17 for each of the classes.

The prediction tap extracting unit 125 extracts, from the input image, a predetermined prediction tap corresponding to the pixel of interest on the basis of the class code supplied from the classifier unit 123. The prediction tap extracting unit 125 supplies the extracted prediction tap to the pixel value predicting unit 126.

The pixel value predicting unit 126 predicts the pixel value of the pixel of interest of the high-bandwidth image using the prediction tap supplied from the prediction tap extracting unit 125 and the tap coefficient supplied from the coefficient memory 124 through computation indicated by the following equation:

$$y_i = \sum_j w_j(x_{ij} - \bar{x}_i) + \bar{x}_i \tag{4}$$

where i represents the pixel-of-interest number, w represents the tap coefficient, j represents the pixel number of a pixel in the tap, and $y_i$ represents the output data of the bandwidth restoring apparatus. In addition, in equation (4), a bar indicates an average value of the pixel values of the pixels in the tap. At that time, the average value is computed by simply summing the pixel values and dividing the sum by the number of the pixels. Alternatively, the average value is computed by weighting some of the pixel values, summing the pixel values, and dividing the sum by the number of the pixels.

The pixel value predicting unit 126 outputs an HD image formed from the pixel values predicted by sequentially selecting each of all of the pixels of the high-bandwidth image as the pixel of interest.

Figure 19:
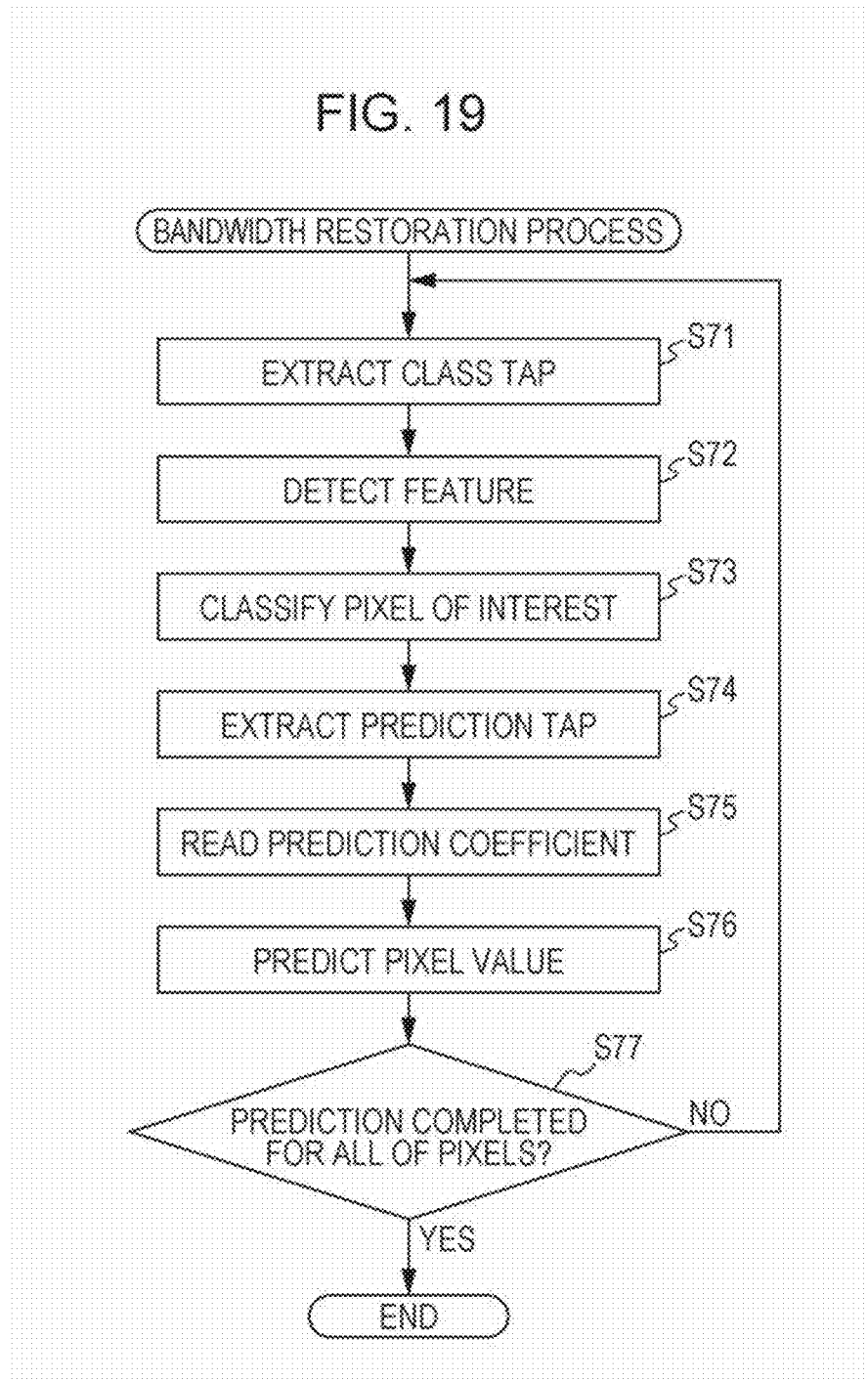
FIG. 19 is a flowchart illustrating an exemplary bandwidth restoring process.

FIG. 19 is a flowchart illustrating an exemplary bandwidth restoring process performed by the bandwidth restoring apparatus that generates a high-bandwidth output image from a low-bandwidth input image through the adaptive classification process.

In step S71, the class tap extracting unit 121 extracts a class tap corresponding to the selected pixel of interest from the input image. In step S72, the feature detecting unit 122 detects the feature corresponding to the pixel of interest from the input image.

In step S73, the classifier unit 123 groups the pixel of interest into one of the classes on the basis of the class tap extracted in step S71 and the feature detected in step S122.

In step S74, the prediction tap extracting unit 125 extracts the prediction tap corresponding to the pixel of interest from the input image in accordance with the result of classification performed in step S73. In step S75, the coefficient memory 124 reads the prediction coefficient corresponding to the selected class from among the prediction coefficients pre-stored therein in accordance with the result of classification performed in step S73.

In step S76, the pixel value predicting unit 126 predicts the pixel value corresponding to the pixel of interest through the adaptation process on the basis of the prediction tap extracted in step S74 and the prediction coefficient read in step S75. At that time, for example, computation is performed using equation (4).

In step S77, the image processing apparatus determines whether prediction has been performed for all of the pixels. If it is determined that prediction has not yet been performed for all of the pixels, the next pixel is selected as the pixel of interest, and the processing returns to step S71. Subsequently, the classification process and the adaptation process are repeatedly performed.

If, in step S77, it is determined that prediction has been performed for all of the pixels, the processing is completed.

In this manner, the adaptive classification process is performed. While the present exemplary embodiment has been described with reference to generation of a high-bandwidth output image from a low-bandwidth input image, an enlarged image obtained by increasing the number of pixels of the input image through the adaptive classification process may be generated.

According to the present exemplary embodiment, an area having a high similarity to the pixel of interest and the pixels around the pixel of interest is detected. However, for example, the image of an area selected as an area having a high similarity by the similarity detecting unit 25 using equation (1) is not necessarily sufficiently similar to the pixel of interest and the pixels around the pixel of interest.

For example, if an area selected as an area having a high similarity by the similarity detecting unit 25 is not sufficiently similar to the pixel of interest and the pixels around the pixel of interest, noise occurs in a partial area of the output image. For example, noise that causes the luminance to be alternatively too high and too low occurs. Such too high luminance (or too low luminance) occurs when, for example, the luminance of a pixel having a bandwidth restored on the basis of a tap constructed by the second prediction tap constructing unit 32 does not match the luminance of a pixel in the vicinity of the pixel of interest.

Figure 20:
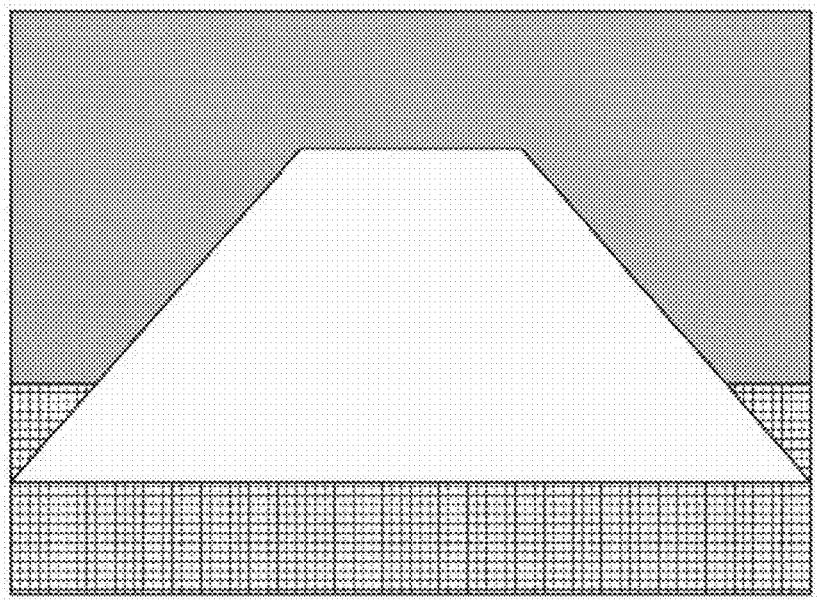
FIG. 20 illustrates an example of an ideal output image.

FIG. 20 illustrates an example of an ideal output image. In FIG. 20, the image of a mountain is illustrated.

Figure 21:
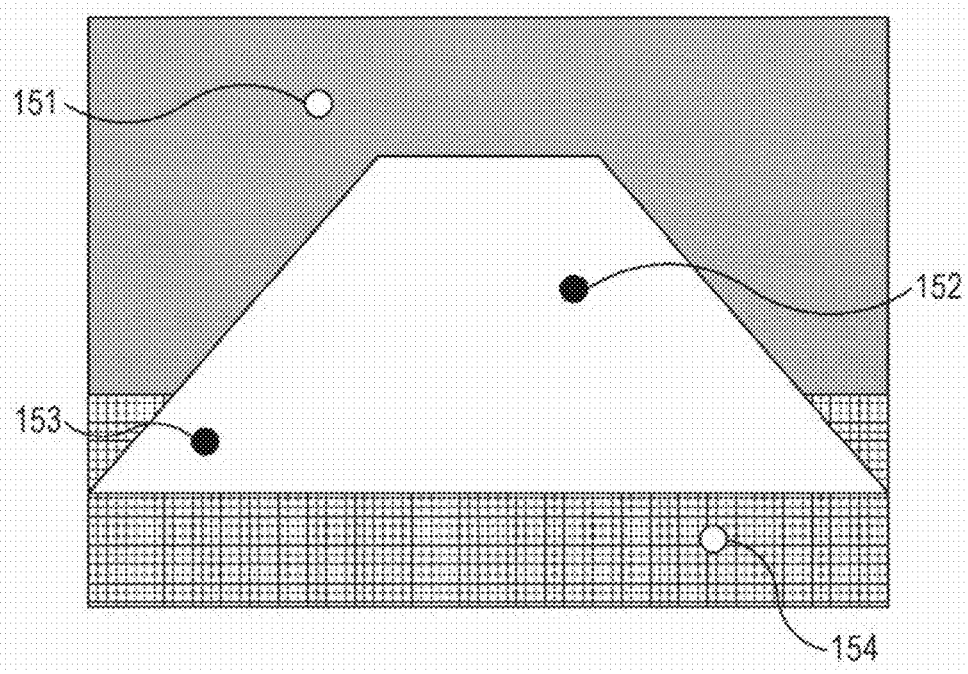
FIG. 21 illustrates an example of an image having too high and low luminance.

FIG. 21 illustrates an example of an image having too high (and too low) luminance. As in FIG. 20, the image of a mountain is illustrated in FIG. 21. An area 151 and an area 154 are displayed white. Thus, too high luminance occurs. In contrast, an area 152 and an area 153 are displayed black. Thus, too low luminance occurs.

For example, if the control scheme of the mixing control unit 26 is changed so that the blend ratio of the output data of the second bandwidth restoring unit 34 is decreased, the too high luminance (or too low luminance) illustrated in FIG. 21 can be largely prevented. However, if the blend ratio of the pixel value obtained by restoring the bandwidth of the pixels around the pixel position $k_{min}$ is decreased in every case, the same problem as in existing technologies arises. For example, when an image is enlarged, a thin line may be rendered as a thick line. Ringing degradation may occur, and noise may be changed to swelling noise.

Accordingly, for example, an area of the image in which too high luminance (or too low luminance) is noticeable is identified in advance. Thereafter, the blend ratio of the pixel value obtained by restoring the bandwidth of the pixels around the pixel position $k_{min}$ is significantly decreased for the area. In this manner, the problem of the too high luminance (or too low luminance) can be effectively solved.

In general, the too high luminance (or too low luminance) is noticeable in a flat area of an image, that is, an area where a change in luminance value of a pixel is gentle. For example, as illustrated in FIG. 21, the too high luminance (or too low luminance) is generally noticeable in the flat areas, such as a mountain slope, the sky, and a land.

Figure 22A:
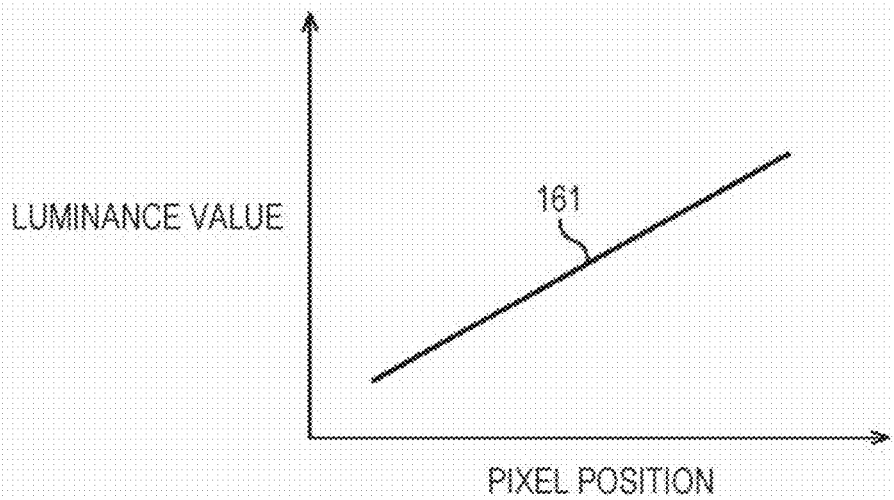
FIGS. 22A and 22B illustrate a flat area and a non-flat area of an image.
Figure 22B:
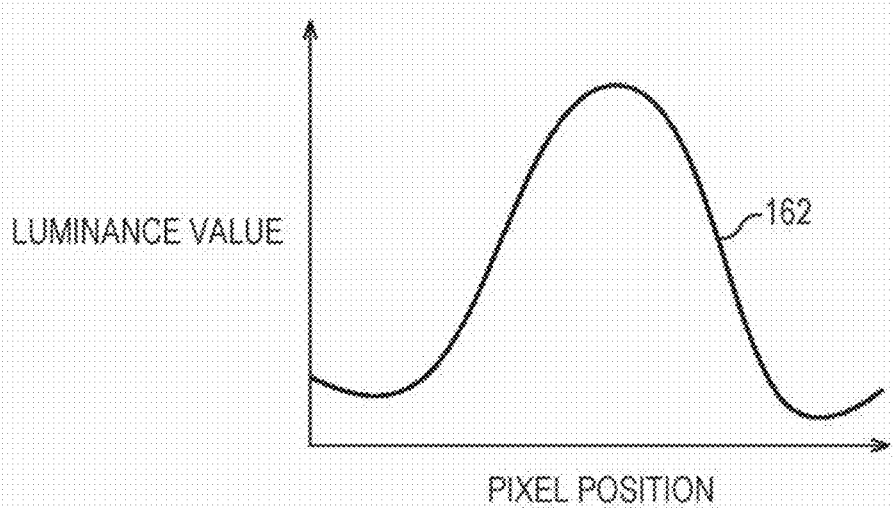

FIGS. 22A and 22B illustrate a flat area and a non-flat area of an image. In FIG. 22A, the abscissa represents the pixel position, and the ordinate represents the luminance value. The luminance values of the pixels in a flat area of the image are indicated by a line 161. In FIG. 22B, the abscissa represents the pixel position, and the ordinate represents the luminance value. The luminance values of the pixels in a non-flat area of the image (e.g., an area including a thin line) are indicated by a line 162.

In FIG. 22A, the line 161 gently goes up toward the right. In a flat area of the image, a difference between the luminance values of adjacent pixels is small at all times. In contrast, in FIG. 22B, the line 162 is largely curved in the middle of the drawing. For example, in regions located a little to the right and left of the middle of the drawing, a difference between the luminance values of adjacent pixels is large.

Figure 23:
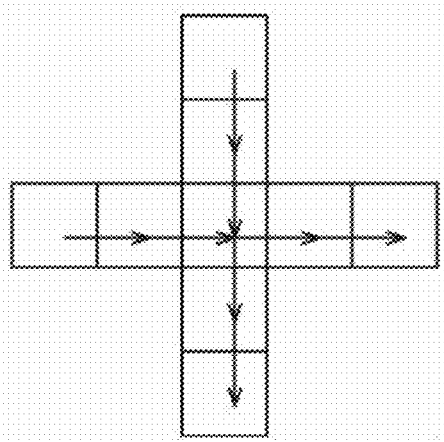
FIG. 23 illustrates a first derivation DR.

For example, in an image, some central pixel is selected. Thereafter, as illustrated in FIG. 23, a pixel group having five pixels in the vertical direction and five pixels in the horizontal direction is acquired. In this example, a figure indicating a cross is illustrated. Each of rectangles that constitute the figure represents a pixel. Thereafter, as indicated by arrows, the absolute difference between the pixels that are adjacent to each other in the vertical direction is computed. In addition, the absolute difference between the pixels that are adjacent to each other in the horizontal direction is computed. Thus, eight absolute differences (i.e., four absolute differences in the vertical direction and four absolute differences in the horizontal direction) are obtained. Subsequently, the difference between the largest value and the smallest value among the eight absolute differences (i.e., Dynamic Range: DR) is computed.

The difference between the largest value and the smallest value obtained in the above-described manner is referred to as a "first derivation DR". If the first derivation DR is small, it can be determined that the area around the central pixel is flat. However, if the first derivation DR is large, it can be determined that the area around the central pixel is not flat.

Figure 24:
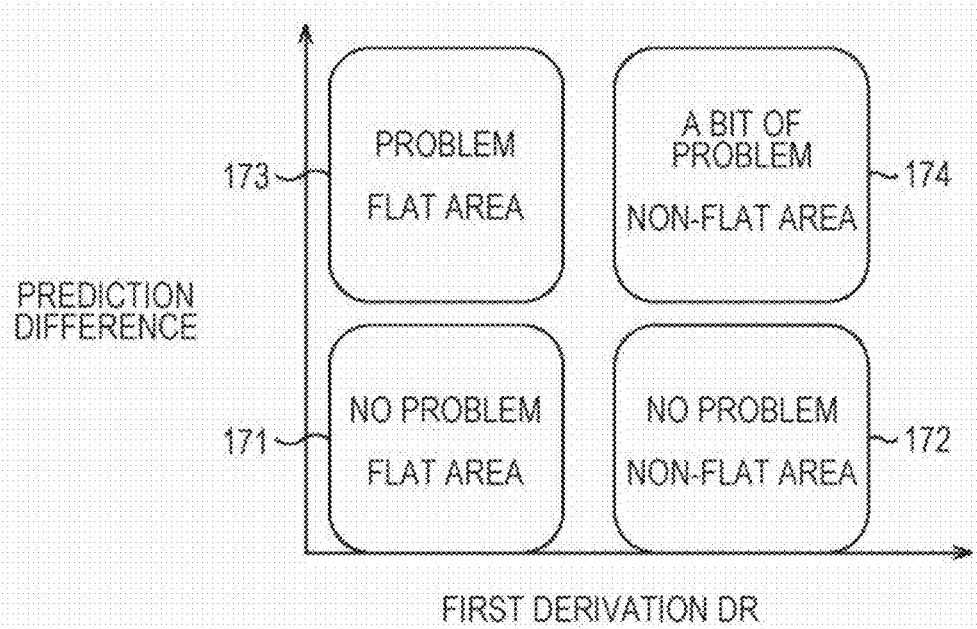
FIG. 24 illustrates a problem arising when the blend ratio of a pixel value is increased.

That is, the problems arising when the blend ratio of the pixel value obtained by restoring the bandwidth of the pixels around the pixel position $k_{min}$ is increased can be summarized as illustrated in FIG. 24.

In FIG. 24, the abscissa represents the first derivation DR, and the ordinate represents a prediction difference. Four areas 171 to 174 are illustrated in FIG. 24. In the present exemplary embodiment, the value $diff_{ik}$ computed using equation (1) is used as the prediction difference, for example. Alternatively, the prediction difference may be the sum of the absolute differences between the pixel value that constitutes the prediction tap of the first prediction tap constructing unit 31 and the pixel value that constitutes the prediction tap of the second prediction tap constructing unit 32. Note that the term "area" used in FIG. 24 refers to only an area of a two-dimensional space in FIG. 24. That is, the term "area" in FIG. 24 differs from the term "area" of an image.

The area 171 of FIG. 24 is an area in which the first derivation DR is small and the prediction difference is small. In such a case, the second prediction tap constructing unit 32 constructs the prediction tap from a flat portion of the image which is an area having a sufficiently high similarity to the vicinity of the pixel of interest. At that time, it is unlikely that a too high luminance or a too low luminance occurs. Thus, for the area 171, even when the blend ratio of the pixel value obtained by bandwidth-restoring the pixel values of the pixels in the vicinity of the pixel position $k_{min}$ is increased, any problem does not arise.

The area 172 of FIG. 24 represents an area in which the first derivation DR is large and the prediction difference is small. In such a case, the second prediction tap constructing unit 32 constructs the prediction tap from a non-flat portion of the image which is an area having a sufficiently high similarity to the vicinity of the pixel of interest. At that time, it is unlikely that a too high luminance or a too low luminance occurs. Thus, for the area 172, even when the blend ratio of the pixel value obtained by bandwidth-restoring the pixel values of the pixels in the vicinity of the pixel position $k_{min}$ is increased, any problem does not arise.

The area 173 of FIG. 24 is an area in which the first derivation DR is small and the prediction difference is large. In such a case, the second prediction tap constructing unit 32 constructs the prediction tap from a flat portion of the image which is an area not having a sufficiently high similarity to the vicinity of the pixel of interest. At that time, it is highly likely that a too high luminance or a too low luminance occurs. In addition, too high luminance or a too low luminance is noticeable. Thus, for the area 173, increasing the blend ratio of the pixel value obtained by bandwidth-restoring the pixel values of the pixels in the vicinity of the pixel position $k_{min}$ causes a problem.

The area 174 of FIG. 24 is an area in which the first derivation DR is large and the prediction difference is large. In such a case, the second prediction tap constructing unit 32 constructs the prediction tap from a non-flat portion of the image which is an area not having a sufficiently high similarity to the vicinity of the pixel of interest. At that time, it is highly likely that a too high luminance or a too high or low luminance occurs. However, too high luminance or a too low luminance is not noticeable. Thus, for the area 174, increasing the blend ratio of the pixel value obtained by bandwidth-restoring the pixel values of the pixels in the vicinity of the pixel position $k_{min}$ causes a bit of a problem.

For example, part of the tap constructed by the first matching tap constructing unit 23 is supplied to the mixing control unit 26. Thereafter, the first derivation DR obtained when the pixel of interest serves as the central pixel is computed. Subsequently, the following computation is performed using the computed value DRin of the first derivative DR and the sum of the absolute differences between the pixel value that constitutes the prediction tap of the first prediction tap constructing unit 31 and the pixel value that constitutes the prediction tap of the second prediction tap constructing unit 32:

$$Tout=|IM1-IM2|/DRin \quad (5)$$

where IM1 represents a value obtained by subtracting the average of the pixel values that constitute the prediction tap of the first prediction tap constructing unit 31 from one of the pixel values that constitute the prediction tap of the first prediction tap constructing unit 31, IM2 represents a value obtained by subtracting the average of the pixel values that constitute the prediction tap of the second prediction tap constructing unit 32 from one of the pixel values that constitute the prediction tap of the second prediction tap constructing unit 32, and |IM1−IM2| represents the sum of the absolute differences between IM1 and IM2.

Tout obtained through computation using equation (5) serves as a reference value used for determining the level of a problem caused by increasing the blend ratio of the pixel values obtained by performing a bandwidth restoring process on the pixels located around the pixel position $k_{min}$.

FIG. 25 illustrates another setting example of the blend ratio performed by the mixing control unit 26. In FIG. 25, the abscissa represents Tout, the ordinate represents a blend ratio β. A setting value for the blend ratio β in accordance with Tout is illustrated in FIG. 25.

In the example illustrated in FIG. 25, if Tout is less than or equal to a threshold value th, the value of the blend ratio β is in the range 0≤β≤1. In that range, as Tout increases, the value of the blend ratio β increases. If Tout exceeds the threshold value th, the value of the blend ratio β is set to a constant value of "1".

For example, if the blend ratio β is used instead of the blend ratio α appearing in equation (3), a blend ratio suitable for each of the areas 171 to 174 illustrated in FIG. 24 can be adaptively set.

Alternatively, a larger one of the blend ratio α illustrated in FIG. 13 and the blend ratio β illustrated in FIG. 25 may be used as the blend ratio α appearing in equation (3).

An example of a blend ratio setting process performed by the mixing control unit 26 that sets the blend ratio illustrated in FIG. 25 is described next with reference to a flowchart illustrated in FIG. 26. For example, in the above-described image processing illustrated in FIG. 14, this process is performed immediately before the process in step S30.

In step S101, the mixing control unit 26 acquires the prediction difference. At that time, for example, $diff_{ik}$ computed using equation (1) is acquired. Alternatively, the following value may be acquired as the prediction difference: the sum of absolute differences between the pixel value that constitutes the prediction tap of the first prediction tap constructing unit 31 and the pixel value that constitutes the prediction tap of the second prediction tap constructing unit 32.

In step S102, the mixing control unit 26 computes the first derivation DR. At that time, for example, part of the tap constructed by the first matching tap constructing unit 23 is supplied, and the first derivation DR obtained when the pixel of interest serves as the central pixel is computed.

In step S103, the mixing control unit 26 computes Tout. At that time, for example, Tout is computed using equation (5).

In step S104, for example, as described above with reference to FIG. 25, the mixing control unit 26 sets the blend ratio β on the basis of Tout computed in step S103.

In this manner, the blend ratio setting process is performed. Through the above-described blend ratio setting process, even when too high or low luminance occurs, the too high or low luminance can be made unnoticeable.

While the present exemplary embodiment has been described with reference to an example in which the first derivation DR is used in order to compute a reference value for determining the level of a problem arising when the blend ratio of the pixel value obtained by bandwidth-restoring the pixel values of the pixels in the vicinity of the pixel position $k_{min}$ is increased, Tout may be computed without using the first derivation DR.

For example, Tout may be computed as follows:

$$Tout=||IM|-|IM2|| \quad (6)$$

In general, in an area of an image having a fine pattern, an image in the area that is determined to have a high similarity by the similarity detecting unit 25 is not sufficiently similar to the image of the pixel of interest and the surrounding pixels. This is because in an area of an image having a fine pattern, the luminance values of the pixels vary at high frequency. Thus, the values of $diff_{ik}$ computed using, for example, equation (1) are substantially the same throughout the search area.

If, as described above, the image of an area that is determined to have a high similarity by the similarity detecting unit 25 is not sufficiently similar to the image of the pixel of interest and the surrounding pixels, it is highly likely that geometric degradation of the image occurs in addition to the occurrence of too high or too low luminance. As used herein, the term "geometric degradation of an image" refers to a phenomenon in which, for example, fine texture of an image disappears, the edge of the texture is enhanced and, thus, a geometric pattern seems to be formed.

Such geometric degradation of an image negligibly occurs in areas of edges and lines in the image. In contrast, geometric degradation frequently occurs in areas of very fine patterns in the image.

Accordingly, if the similarity is more accurately detected in an area other than an edge and a line of the image, such a problem can be solved.

An object (a tangible object) in a real world has a constant feature in the spatial direction or a temporal direction. More specifically, an object having a linear shape, such as a yarn, a cord, or a lope, has a feature indicating that the cross-sectional shapes thereof are the same at any points in the length direction. That is, the object has a constant feature in the spatial direction. The feature indicating that the cross-sectional shapes thereof are the same at any points in the spatial direction results from the fact that a linear shaped object has a length.

Thus, the image of a linear shaped object has a feature indicating that the cross-sectional shapes thereof are the same at any points in the length direction. That is, the image of the object has a constant feature in the spatial direction. Such a constant feature existing in a predetermined dimension is referred to as "stationarity". By detecting the stationarity in an image, it can be determined whether the above-described geometric degradation easily occurs.

FIG. 27 is a block diagram of an exemplary configuration of an image processing apparatus according to another exemplary embodiment of the present disclosure.

Unlike the configuration illustrated in FIG. 1, in the example illustrated in FIG. 27, a feature extracting unit 41 is provided. The feature extracting unit 41 extracts the pixel of interest and the pixels around the pixel of interest from the enlarged image output from the pixel quantity conversion unit 21 and detects the presence/absence of the stationarity on the basis of the pixel values of the extracted pixels.

Figure 28A:
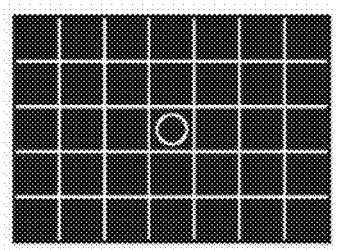
FIGS. 28A and 28B illustrate an example of extraction of a pixel of interest and pixels around the pixel of interest.
Figure 28B:
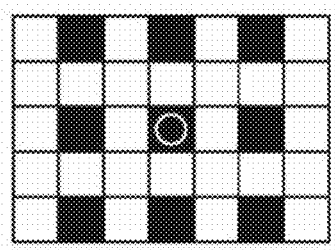

At that time, for example, as illustrated in FIGS. 28A and 28B, the pixel of interest and the pixels around the pixel of interest are acquired. In FIGS. 28A and 28B, a small square represents a pixel, and a square having a circle in the interior represents the pixel of interest. FIG. 28A illustrates an example in which all of 35 (=7×5) pixels at the center of which is the pixel of interest are extracted. FIG. 28B illustrates an example in which 35 (=7×5) pixels at the center of which is the pixel of interest are thinned out and extracted.

In order to detect the stationarity, from the pixel values acquired in the above-described manner illustrated in FIGS. 28A and 28B, first derivative values (a difference between the pixel values of adjacent pixels) are computed for each of the vertical direction, the horizontal direction, a diagonally right upward direction, and a diagonally left upward direction. Thereafter, the difference (DR) between the largest value and the smallest value of these first derivative values is computed for each of the directions. That is, if any one of the first derivations DR for the four directions is greater than a predetermined threshold value, a line or an edge is present in the direction. Accordingly, if the first derivation DR exceeds the predetermined threshold value, it can be determined that the stationarity is present (i.e., the stationarity is detected).

Alternatively, the presence of the stationarity may be detected on the basis of the variance of the pixel values extracted in the manner illustrated in FIGS. 28A and 28B or the output value of an edge extraction filter.

If the feature extracting unit 41 determines that the image in the area formed from the pixel of interest and the pixels around the pixel of interest has the stationarity, a signal indicating the presence of the stationarity is output to the first matching tap constructing unit 23 and the second matching tap constructing unit 24.

In the configuration illustrated in FIG. 27, if the image in the area formed from the pixel of interest and the pixels around the pixel of interest has not the stationarity, each of the first matching tap constructing unit 23 and the second matching tap constructing unit 24 reduces the tap size of the matching tap.

Figure 29A:
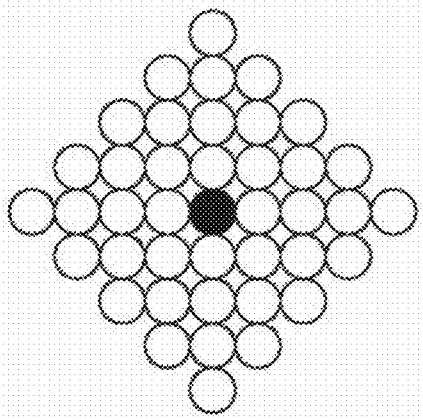
FIGS. 29A and 29B illustrate a tap size.
Figure 29B:
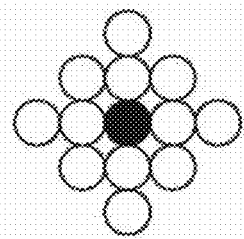

For example, if a signal indicating the presence of the stationarity is output from the feature extracting unit 41, each of the first matching tap constructing unit 23 and the second matching tap constructing unit 24 constructs a matching tap formed from 41 pixels at the center of which is the pixel of interest, as illustrated in FIG. 29A. However, if a signal indicating the presence of the stationarity is not output from the feature extracting unit 41, each of the first matching tap constructing unit 23 and the second matching tap constructing unit 24 constructs a matching tap formed from 13 pixels at the center of which is the pixel of interest, as illustrated in FIG. 29B.

Thereafter, the similarity detecting unit 25 detects the similarity between the matching tap constructed by the first matching tap constructing unit 23 and the matching tap constructed by the second matching tap constructing unit 24. At that time, computation using equation (1) is performed so that the similarity is detected. That is, if a signal indicating the presence of the stationarity is output from the feature extracting unit 41, the self-similarity can be detected in an area formed from less number of pixels.

In this manner, in an area of the image other than an edge and a line, the self-similarity is detected in an area formed from less number of pixels. For example, even in an area in which the luminance of the pixels varies in high frequency, if a matching tap formed from less number of pixels is used, it is unlikely that the value of $\mathrm{diff}_{ik}$ computed using equation (1) is the same in any section of the search area. Accordingly, in an area of the image other than an edge and a line, the similarity can be more accurately detected.

Alternatively, if the feature extracting unit 41 detects that the image in an area formed from the pixel of interest and the pixels around the pixel of interest has the stationarity, a signal indicating the presence of the stationarity may be output to the mixing control unit 26. For example, if the feature extracting unit 41 does not output a signal indicating the presence of the stationarity, the mixing control unit 26 modulates the blend ratio α appearing in equation (3) so that the blend ratio α is increased. That is, if the stationarity is not present, the blend ratio α is controlled so as to have a value greater than a normal value (e.g., the value determined by the graph illustrated in FIG. 13). In this manner, in an area of the image other than an edge and a line, the blend ratio α is set so that the pixel value obtained by restoring the pixels around the pixel of interest is largely mixed. This is because in an area of the image other than an edge and a line, the self-similarity detection accuracy is low even when the tap size of the matching tap is reduced.

As described above, the blend ratio α may be modulated by the mixing control unit 26 on the basis of the result of detection of the stationarity performed by the feature extracting unit 41.

A stationarity detection control process performed by the image processing apparatus 10 of the present exemplary embodiment having the configuration illustrated in FIG. 27 is described next with reference to a flowchart illustrated in FIG. 30. For example, in the above-described image processing illustrated in FIG. 14, this process is performed immediately before the process in step S23.

In step S121, the feature extracting unit 41 extracts the pixel of interest and the pixels around the pixel of interest from an enlarged image output from the pixel quantity conversion unit 21. At that time, for example, as described above with reference to FIGS. 28A and 28B, the pixel of interest and the pixels around the pixel of interest are extracted, and the pixel values of the extracted pixels are acquired.

In step S122, the feature extracting unit 41 computes the feature on the basis of the pixels extracted in step S121. At that time, as the feature, first derivative values (a difference between the pixel values of adjacent pixels) are computed for each of the vertical direction, the horizontal direction, a diagonally right upward direction, and a diagonally left upward direction. Thereafter, the difference (DR) between the largest value and the smallest value of these first derivative values is computed for each of the directions. Alternatively, the variance of the pixel values of the pixels detected in the manner illustrated in FIGS. 28A and 28B or the output value of an edge extraction filter may be obtained.

In step S123, the feature extracting unit 41 identifies the presence/absence of the stationarity by, for example, comparing the feature computed in step S122 with a threshold value.

In step S124, it is determined whether the stationarity is present on the basis of the result of processing performed in step S123.

If, in step S124, it is determined that the stationarity is present, the feature extracting unit 41 outputs a signal indicating that the image in the area formed from the pixel of interest and the pixels around the pixel of interest has the stationarity to the first matching tap constructing unit 23, the second matching tap constructing unit 24, and the mixing control unit 26. However, if it is determined that the stationarity is not present, such a signal is not output.

If, in step S124, it is determined that the stationarity is not present, the processing proceeds to step S125.

In step S125, each of the first matching tap constructing unit 23 and the second matching tap constructing unit 24 reduces the tap size of the matching tap. At that time, for example, the tap size illustrated in FIG. 29B is set.

In step S126, the mixing control unit 26 modulates the blend ratio α so that the blend ratio α appearing in equation (3) is increased.

As described above, the stationarity detection control process is performed. In this manner, geographic degradation of an image can be reduced.

While the present exemplary embodiment has been described with reference to the image processing apparatus 10 that restores the bandwidth of an image enlarged by a desired magnification factor, the present exemplary embodiment is also applicable when the bandwidth of an image having a size that is the same as the size of an input image is restored.

The above-described series of processes can be executed not only by hardware but also by software. When the above-described series of processes are executed by software, the programs of the software are installed from a network or a recording medium into a computer integrated into dedicated hardware or a general-purpose personal computer (e.g., a general-purpose personal computer 700 illustrated in FIG. 31) that allows a variety of programs to be installed therein and performs a variety of functions.

Figure 31:
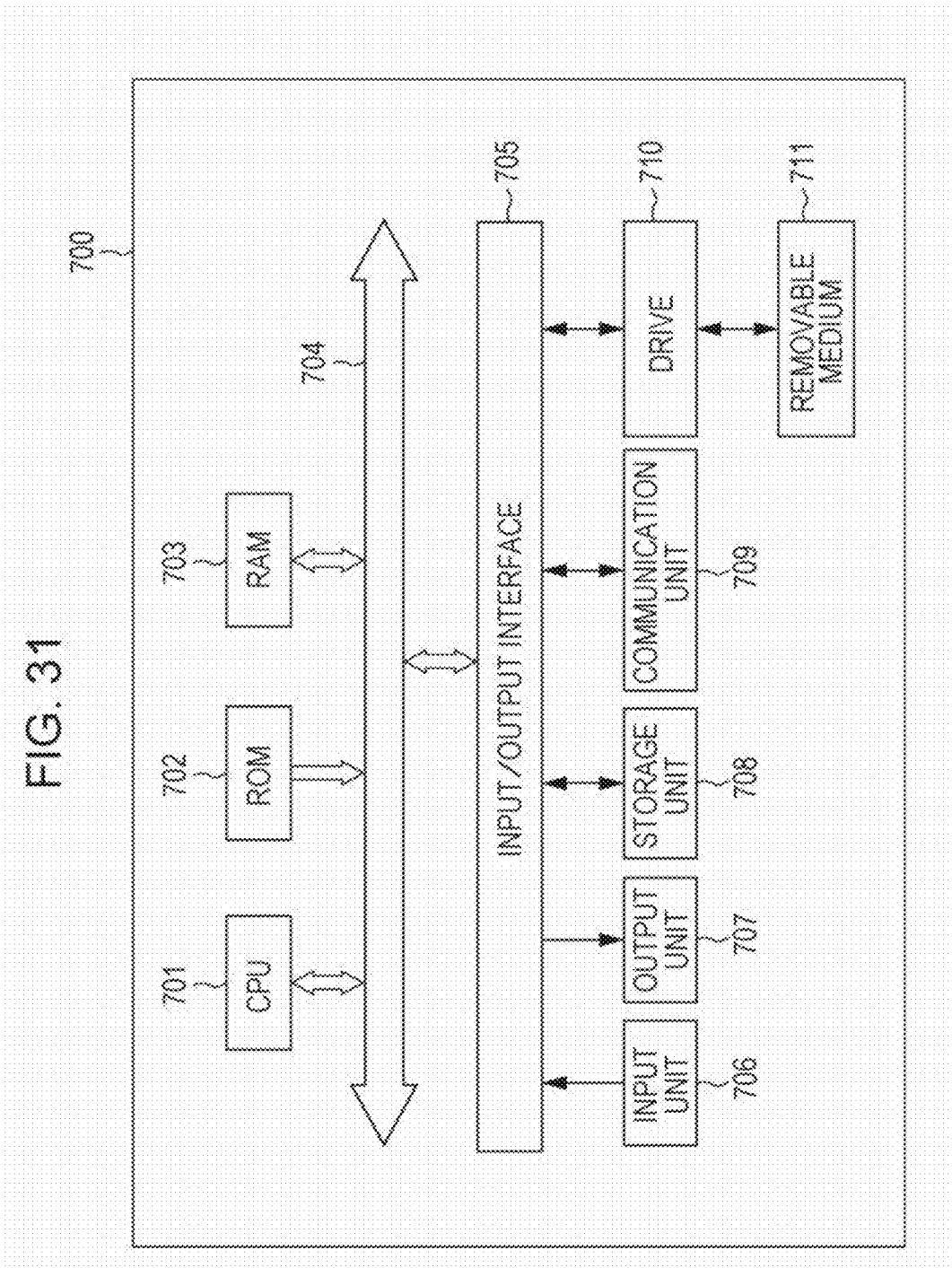
FIG. 31 is a block diagram of an exemplary configuration of a personal computer.

In FIG. 31, a central processing unit (CPU) 701 performs a variety of processes in accordance with programs stored in a read only memory (ROM) 702 or programs loaded from a storage unit 708 into a random access memory (RAM) 703. In addition, the RAM 703 stores data necessary for the CPU 701 to perform the variety of processes as necessary.

The CPU 701, the ROM 702, and the RAM 703 are connected to one another via a bus 704. In addition, an input/output interface 705 is connected to the bus 704.

Furthermore, the following devices are connected to the input/output interface 705: an input unit 706 including, for example, a keyboard and a mouse, a display formed from, for example, a liquid crystal display (LCD), an output unit 707 including, for example, a speaker, a storage unit 708 formed from, for example, a hard disk, and a communication unit 709 formed from a network interface card, such as a modem or a LAN card. The communication unit 709 performs a communication process via a network, such as the Internet.

Still furthermore, a drive 710 is connected to the input/output interface 705 as necessary. Thus, a removable medium 711, such as a magnetic disk, an optical disk, a magnetooptical disk, or a semiconductor memory, is mounted in the drive 710 as necessary. Thereafter, a computer program read from the removable medium 711 is installed in the storage unit 708 as necessary.

In order to perform the above-described series of processes by software, the programs that constitute the software are installed from a network, such as the Internet, or a recording medium, such as the removable medium 711.

Note that examples of such a recording medium include the removable medium 711 that is used to deliver the programs to users separately from a apparatus body (refer to FIG. 31) and that is formed from a magnetic disk (including a Floppy Disk™), an optical disk (including a CD-ROM (Compact Disc-Read Only Memory), a DVD (Digital Versatile Disc), and a magnetooptical disk including a Mini-disk™, or a semiconductor disk. In addition, examples of the recording medium include the ROM 702 that is pre-mounted in the apparatus body with the programs installed therein and that is distributed to a user and a hard disk included in the storage unit 708.

Note that the above-described series of processes may be processes that are performed in the above-described sequence or processes that are performed in parallel or on demand.

It should be understood by those skilled in the art that various modifications, combinations, sub-combinations and alterations may occur depending on design requirements and other factors insofar as they are within the scope of the appended claims or the equivalents thereof.

Note that the present disclosure can also provide the following configurations:

(1) An image processing apparatus includes a first matching tap acquiring unit configured to acquire a matching tap at the center of which is a pixel of interest, where the matching tap represents a plurality of pixels located at predetermined positions at the center of which is a predetermined pixel, a second matching tap acquiring unit configured to acquire a plurality of matching taps at the center of each of which is one of pixels in a search area formed from a plurality of pixels surrounding the pixel of interest, a similarity identifying unit configured to identify, among the plurality of matching taps acquired by the second matching tap acquiring unit, a similarity maximizing pixel representing a central pixel of the matching tap having the highest similarity to the matching tap acquired by the first matching tap acquiring unit, and a pixel value mixing control unit configured to compute a pixel value of the pixel of interest by mixing a first computed pixel value with a second computed pixel value, where the first computed pixel value is obtained by performing a predetermined arithmetic process on pixel values of a prediction tap at the center of which is the pixel of interest, the prediction tap represents a plurality of pixels located at predetermined positions at the center of which is a predetermined pixel, and the second computed pixel value is obtained by performing a predetermined arithmetic process on pixel values of a prediction tap at the center of which is the similarity maximizing pixel.

(2) In the image processing apparatus according to the configuration (1), the pixel of interest in the matching tap acquired by the first matching tap acquiring unit is a pixel of an image obtained by enlarging an input image by a desired magnification factor, and a bandwidth of the enlarged image is restored by assigning the pixel value computed by the pixel value mixing control unit to the value of the pixel of interest.

(3) In the image processing apparatus according to the configuration (2), a pixel interval of the matching tap acquired by the first matching tap acquiring unit differs from a pixel interval of the matching tap acquired by the second matching tap acquiring unit, and the pixel interval of the matching tap acquired by the second matching tap acquiring unit is determined in accordance with the magnification factor.

(4) In the image processing apparatus according to any one of the configurations (1) to (3), the pixel value mixing control unit sets a blend ratio of the first computed pixel value to the second computed pixel value in accordance with a level of the similarity between the matching tap acquired by the second matching tap acquiring unit and the matching tap acquired by the first matching tap acquiring unit.

(5) In the image processing apparatus according to any one of the configurations (1) to (4), the pixel value mixing control unit mixes the pixel values of the prediction tap at the center of which is the pixel of interest with the pixel values of the prediction tap at the center of which is the similarity maximizing pixel, and the pixel value mixing control unit performs a predetermined arithmetic process on the pixel values of a mixed prediction tap to obtain a pixel value serving as a pixel value of the pixel of interest.

(6) In the image processing apparatus according to any one of the configurations (1) to (5), the pixel value mixing control unit reads, for each of classes grouped by feature computed in accordance with the pixel values of the prediction tap, a plurality of coefficients that correspond to the pixel positions constituting the prediction tap and that are obtained through learning and are prestored. The pixel value mixing control unit computes the first computed pixel value by multiplying the pixel values of the prediction tap at the center of which is the pixel of interest by the coefficients, and the pixel value mixing control unit computes the second computed pixel value by multiplying the pixel values of the prediction tap at the center of which is the similarity maximizing pixel by the coefficients.

(7) In the image processing apparatus according to any one of the configurations (1) to (6), the pixel value mixing control unit computes a reference value corresponding to the pixel of interest on the basis of a dynamic range of a first derivative value in a predetermined direction in an area formed from a plurality of pixels at the center of which is the pixel of interest, and the pixel value mixing control unit sets a blend ratio of the first computed pixel value to the second computed pixel value on the basis of the reference value.

(8) In the image processing apparatus according to any one of the configurations (1) to (7), the pixel value mixing control unit computes a reference value corresponding to the pixel of interest on the basis of an absolute difference value between the pixel values of the prediction tap at the center of which is the similarity maximizing pixel, and the pixel value mixing control unit sets a blend ratio of the first computed pixel value to the second computed pixel value on the basis of the reference value.

(9) In the image processing apparatus according to any one of the configurations (1) to (8), a stationarity determination unit is further provided. The stationarity determination unit determines whether a stationarity is present in an area formed from a plurality of pixels at the center of which is the pixel of interest. If it is determined that the stationarity is not present in the area, each of the first matching tap acquiring unit and the second matching tap acquiring unit reduces the number of pixels of the matching tap.

(10) In the image processing apparatus according to the configuration (9), the stationarity determination unit determines whether the stationarity is present on the basis of one of a dynamic range of a first derivative value in a predetermined direction in the area formed from a plurality of pixels at the center of which is the pixel of interest, a variance of the pixel values in the area, and an output value of an edge extraction filter applied on an image in the area.

(11) In the image processing apparatus according to any one of the configurations (1) to (10), a stationarity determination unit is further provided. The stationarity determination unit determines whether a stationarity is present in an area formed from a plurality of pixels at the center of which is the pixel of interest. If it is determined that the stationarity is not present in the area, a blend ratio of the first computed pixel value to the second computed pixel value is modulated.

(12) An image processing method includes acquiring a matching tap at the center of which is a pixel of interest using a first matching tap acquiring unit, where the matching tap represents a plurality of pixels located at predetermined positions at the center of which is a predetermined pixel, acquiring a plurality of matching taps at the center of each of which is one of pixels in a search area formed from a plurality of pixels surrounding the pixel of interest using a second matching tap acquiring unit, identifying, among the plurality of matching taps acquired by the second matching tap acquiring unit, a similarity maximizing pixel representing a central pixel of the matching tap having the highest similarity to the matching tap acquired by the first matching tap acquiring unit using a similarity identifying unit, and computing a pixel value of the pixel of interest using a pixel value mixing control unit by mixing a first computed pixel value with a second computed pixel value, where the first computed pixel value is obtained by performing a predetermined arithmetic process on pixel values of a prediction tap at the center of which is the pixel of interest, the prediction tap represents a plurality of pixels located at predetermined positions at the center of which is a predetermined pixel, and the second computed pixel value is obtained by performing a predetermined arithmetic process on pixel values of a prediction tap at the center of which is the similarity maximizing pixel.

(13) A computer-readable program includes code for causing a computer to function as an image processing apparatus. The image processing apparatus including a first matching tap acquiring unit configured to acquire a matching tap at the center of which is a pixel of interest, where the matching tap represents a plurality of pixels located at predetermined positions at the center of which is a predetermined pixel, a second matching tap acquiring unit configured to acquire a plurality of matching taps at the center of each of which is one of pixels in a search area formed from a plurality of pixels surrounding the pixel of interest, a similarity identifying unit configured to identify, among the plurality of matching taps acquired by the second matching tap acquiring unit, a similarity maximizing pixel representing a central pixel of the matching tap having the highest similarity to the matching tap acquired by the first matching tap acquiring unit, and a pixel value mixing control unit configured to compute a pixel value of the pixel of interest by mixing a first computed pixel value with a second computed pixel value, where the first computed pixel value is obtained by performing a predetermined arithmetic process on pixel values of a prediction tap at the center of which is the pixel of interest, the prediction tap represents a plurality of pixels located at predetermined positions at the center of which is a predetermined pixel, and the second computed pixel value is obtained by performing a predetermined arithmetic process on pixel values of a prediction tap at the center of which is the similarity maximizing pixel.

The present disclosure contains subject matter related to that disclosed in Japanese Priority Patent Application JP 2012-110272 filed in the Japan Patent Office on May 14, 2012, the entire contents of which are hereby incorporated by reference.

What is claimed is:

1. An image processing apparatus comprising:
    a first matching tap acquiring unit configured to acquire, from within an input image, a matching tap at the center of which is a pixel of interest, the matching tap representing a plurality of pixels located at predetermined positions at the center of which is a predetermined pixel;
    a second matching tap acquiring unit configured to acquire, from within the input image, a plurality of matching taps at the center of each of which is one of pixels in a search area formed from a plurality of pixels surrounding the pixel of interest;
    a similarity identifying unit configured to identify, among the plurality of matching taps acquired by the second matching tap acquiring unit, a similarity maximizing pixel representing a central pixel of the matching tap having the highest similarity to the matching tap acquired by the first matching tap acquiring unit; and
    a pixel value mixing control unit configured to compute a pixel value of the pixel of interest by mixing a first computed pixel value with a second computed pixel value, the first computed pixel value being obtained by performing a first predetermined arithmetic process on pixel values of a prediction tap at the center of which is the pixel of interest, the prediction tap representing a plurality of pixels located at predetermined positions at the center of which is the predetermined pixel, the second computed pixel value being obtained by performing a second predetermined arithmetic process on pixel values of a prediction tap at the center of which is the similarity maximizing pixel,
    wherein the first matching tap acquiring unit, the second matching tap acquiring unit, the similarity identifying unit, and the pixel value mixing control unit are each implemented via at least one processor.

2. The image processing apparatus according to claim 1, wherein the pixel of interest in the matching tap acquired by the first matching tap acquiring unit is a pixel of an image obtained by enlarging the input image by a desired magnification factor, and
    wherein a bandwidth of the enlarged image is restored by assigning the pixel value computed by the pixel value mixing control unit to the value of the pixel of interest.

3. The image processing apparatus according to claim 2, wherein a pixel interval of the matching tap acquired by the first matching tap acquiring unit differs from a pixel interval of the matching tap acquired by the second matching tap acquiring unit, and
    wherein the pixel interval of the matching tap acquired by the second matching tap acquiring unit is determined in accordance with the magnification factor.

4. The image processing apparatus according to claim 1, wherein the pixel value mixing control unit sets a blend ratio of the first computed pixel value to the second computed pixel value in accordance with a level of the similarity between the matching tap acquired by the second matching tap acquiring unit and the matching tap acquired by the first matching tap acquiring unit.

5. The image processing apparatus according to claim 1, wherein the pixel value mixing control unit mixes the pixel values of the prediction tap at the center of which is the pixel of interest with the pixel values of the prediction tap at the center of which is the similarity maximizing pixel, and
    wherein the pixel value mixing control unit performs a predetermined arithmetic process on the pixel values of a mixed prediction tap to obtain a pixel value serving as a pixel value of the pixel of interest.

6. The image processing apparatus according to claim 1, wherein the pixel value mixing control unit reads, for each of classes grouped by feature computed in accordance with the pixel values of the prediction tap, a plurality of coefficients that correspond to the pixel positions constituting the prediction tap and that are obtained through learning and are pre-stored,
    wherein the pixel value mixing control unit computes the first computed pixel value by multiplying the pixel values of the prediction tap at the center of which is the pixel of interest by the coefficients, and
    wherein the pixel value mixing control unit computes the second computed pixel value by multiplying the pixel values of the prediction tap at the center of which is the similarity maximizing pixel by the coefficients.

7. The image processing apparatus according to claim 1, wherein the pixel value mixing control unit computes a reference value corresponding to the pixel of interest on the basis of a dynamic range of a first derivative value in a predetermined direction in an area formed from a plurality of pixels at the center of which is the pixel of interest, and
    wherein the pixel value mixing control unit sets a blend ratio of the first computed pixel value to the second computed pixel value on the basis of the reference value.

8. The image processing apparatus according to claim 1, wherein the pixel value mixing control unit computes a reference value corresponding to the pixel of interest on the basis of an absolute difference value between the pixel values of the prediction tap at the center of which is the similarity maximizing pixel, and
    wherein the pixel value mixing control unit sets a blend ratio of the first computed pixel value to the second computed pixel value on the basis of the reference value.

9. The image processing apparatus according to claim 1, further comprising:
    a stationarity determination unit configured to determine whether a stationarity is present in an area formed from a plurality of pixels at the center of which is the pixel of interest,
    wherein if it is determined that the stationarity is not present in the area, each of the first matching tap acquiring unit and the second matching tap acquiring unit reduces the number of pixels of the matching tap, wherein the stationarity determination unit is implemented via at least one processor.

10. The image processing apparatus according to claim 9, wherein the stationarity determination unit determines whether the stationarity is present on the basis of one of a dynamic range of a first derivative value in a predetermined direction in the area formed from a plurality of pixels at the center of which is the pixel of interest, a variance of the pixel values in the area, and an output value of an edge extraction filter applied on an image in the area.

11. The image processing apparatus according to claim 1, further comprising:
a stationarity determination unit configured to determine whether a stationarity is present in an area formed from a plurality of pixels at the center of which is the pixel of interest,
wherein if it is determined that the stationarity is not present in the area, a blend ratio of the first computed pixel value to the second computed pixel value is modulated,
wherein the stationarity determination unit is implemented via at least one processor.

12. An image processing method implemented via a processor, the method comprising:
acquiring, from within an input image, a matching tap at the center of which is a pixel of interest using a first matching tap acquiring unit, the matching tap representing a plurality of pixels located at predetermined positions at the center of which is a predetermined pixel;
acquiring, from within the input image, a plurality of matching taps at the center of each of which is one of pixels in a search area formed from a plurality of pixels surrounding the pixel of interest using a second matching tap acquiring unit;
identifying, among the plurality of matching taps acquired by the second matching tap acquiring unit, a similarity maximizing pixel representing a central pixel of the matching tap having the highest similarity to the matching tap acquired by the first matching tap acquiring unit using a similarity identifying unit; and
computing a pixel value of the pixel of interest using a pixel value mixing control unit by mixing a first computed pixel value with a second computed pixel value, the first computed pixel value being obtained by performing a first predetermined arithmetic process on pixel values of a prediction tap at the center of which is the pixel of interest, the prediction tap representing a plurality of pixels located at predetermined positions at the center of which is the predetermined pixel, the second computed pixel value being obtained by performing a second predetermined arithmetic process on pixel values of a prediction tap at the center of which is the similarity maximizing pixel.

13. A non-transitory computer-readable medium having embodied thereon a program, which when executed by a computer causes the computer to execute a method, the method comprising:
acquiring, from within an input image, a matching tap at the center of which is a pixel of interest using a first matching tap acquiring unit, the matching tap representing a plurality of pixels located at predetermined positions at the center of which is a predetermined pixel;
acquiring, from within the input image, a plurality of matching taps at the center of each of which is one of pixels in a search area formed from a plurality of pixels surrounding the pixel of interest using a second matching tap acquiring unit;
identifying, among the plurality of matching taps acquired by the second matching tap acquiring unit, a similarity maximizing pixel representing a central pixel of the matching tap having the highest similarity to the matching tap acquired by the first matching tap acquiring unit using a similarity identifying unit; and
computing a pixel value of the pixel of interest using a pixel value mixing control unit by mixing a first computed pixel value with a second computed pixel value, the first computed pixel value being obtained by performing a first predetermined arithmetic process on pixel values of a prediction tap at the center of which is the pixel of interest, the prediction tap representing a plurality of pixels located at predetermined positions at the center of which is the predetermined pixel, the second computed pixel value being obtained by performing a second predetermined arithmetic process on pixel values of a prediction tap at the center of which is the similarity maximizing pixel.

* * * * *